United States Patent
Imura

(10) Patent No.: US 7,538,870 B2
(45) Date of Patent: May 26, 2009

(54) MULTI-CHANNEL COLORIMETER AND METHOD FOR MEASURING SPECTRAL INTENSITY CHARACTERISTICS

(75) Inventor: Kenji Imura, Toyohashi (JP)

(73) Assignee: Konica Minolta Sensing Inc., Osaka (JP)

( * ) Notice: Subject to any disclaimer, the term of this patent is extended or adjusted under 35 U.S.C. 154(b) by 71 days.

(21) Appl. No.: 10/984,718

(22) Filed: Nov. 9, 2004

(65) Prior Publication Data

US 2006/0001873 A1    Jan. 5, 2006

(30) Foreign Application Priority Data

Jul. 1, 2004    (JP)    ............... 2004-195783

(51) Int. Cl.
G01J 3/28    (2006.01)
(52) U.S. Cl. ..................................... 356/326
(58) Field of Classification Search ................. 356/326
See application file for complete search history.

(56) References Cited

U.S. PATENT DOCUMENTS 4,669,880 A    6/1987    Nelson et al.
4,917,495 A *  4/1990    Steenhoek ................ 356/328

(Continued)

FOREIGN PATENT DOCUMENTS

| JP | 62-038325 | 2/1987 |
|---|---|---|
| JP | 62-284228 | 12/1987 |
| JP | 4-252924 | 9/1992 |
| JP | 9-049765 | 2/1997 |
| JP | 11-241992 | 9/1999 |
| JP | 2002-013981 | 1/2002 |

OTHER PUBLICATIONS

Sharma, Guarav and Trussell Joel H., Digital Color Imaging, Jul. 1997, IEEE Transactions on Image Processing, vol. 6, No. 7.*

(Continued)

*Primary Examiner*—Kara E Geisel
(74) *Attorney, Agent, or Firm*—Brinks Hofer Gilson & Lione

(57) ABSTRACT

A multi-channel colorimeter has a spectral means which separates light to be measured into components of different wavelengths, a photoelectric converter provided with multiple wavelength channels that receive the separated light to be measured according to the wavelengths to output the corresponding signals at the respective wavelengths, a calculating section that calculates spectral characteristics of the light to be measured based on a composite spectral sensitivity which approximates a predetermined spectral sensitivity by integrating the outputs from the respective wavelength channels multiplied by predetermined weighting factors; and a special weighting factor generator that correctively sets the weighting factors as special weighting factors depending on a spectral intensity of the light to be measured.

11 Claims, 15 Drawing Sheets

U.S. PATENT DOCUMENTS

| | | | | |
|---|---|---|---|---|
| 5,175,697 | A | * | 12/1992 | Kawagoe et al. ............ 356/320 |
| 5,305,233 | A | | 4/1994 | Kawagoe et al. |
| 5,859,709 | A | * | 1/1999 | Imura ........................ 356/446 |
| 7,151,600 | B2 | * | 12/2006 | Imura ........................ 356/326 |
| 7,365,850 | B2 | * | 4/2008 | Imura ........................ 356/419 |
| 7,369,239 | B2 | * | 5/2008 | Nagashima et al. ......... 356/405 |

OTHER PUBLICATIONS

Sharma and Trussel, Set Theoretic Estimation in Color Scanner Characterization, Oct. 1996, Journal of Electronic Imaging, vol. 5, No. 4.*

McCluney, W.R., Introduction to Radiometry and Photometry, 1994, Artech House, Inc.*

Sharma, Gaurav and Trussell, Joel H., "Digital Color Imaging", Jul. 1997, IEEE Transactions on Image Processing, vol. 6, No. 7.*

Trussell, Joel, H. and Kulkarni, M.S., "Sampling and Processing of Color Signals", Apr. 1996, IEEE Transactions on Image Processing, vol. 5, No. 4.*

Sharma, Gaurav and Trussell, Joel H., "Decomposition of Fluorescent Illuminant Spectra For Accurate Colorimetry", Nov. 1994, Proc. IEEE Intl. Conf. Image Processing, vol. 2, p. 1002-1006.*

"Notice of Reasons for Rejections," Office Action (with English Translation) received in Japanese Patent Application No. 2004-195783, Aug. 1, 2006, 9 pages.

Notice of Reasons for Rejection (Office Action) mailed Mar. 6, 2007 in Japanese Application No. 2004-195783, pp. 1-3, and English translation, pp. 1-5.

Final Rejection (Office Action) mailed Nov. 6, 2007 in Japanese Application No. 2004-195783, 2 pages, and English translation, 2 pages.

* cited by examiner

MULTI-CHANNEL COLORIMETER AND METHOD FOR MEASURING SPECTRAL INTENSITY CHARACTERISTICS

This application is based on Japanese Patent Application No. 2004-195783 filed on Jul. 1, 2004, the contents of which are hereby incorporated by reference.

BACKGROUND OF THE INVENTION

1. Field of the Invention

The present invention relates to a multi-channel colorimeter for measuring the colorimetric property of light to be measured (incident light) such as light emanated from a source or light reflected or transmitted from an illuminated sample.

2. Description of the Related Art

It is required that a colorimeter for measuring the colorimetric property of the incident light is provided with a spectral sensitivity approximate to the color-matching function of the Standard Observer, as recommended by the Commission Internationale de l'Eclariage (CIE). In recent years, as the use of a light source emitting monochromatic light or combined monochromatic light, as represented by displays such as a liquid crystal display or a plasma display, as well as an LED (light emitting diode; in general, semiconductor light emitting element) has been popular, a need is increased for higher precision in approximation to the color-matching function for the purpose of precisely measuring the colorimetric property of light emitted from these light sources.

Conventionally, for realizing a spectral sensitivity approximate to the color-matching function, the following two systems have been used:

(1) a filter system building total filter characteristics approximate to the color-matching function by combination of multiple optical filters;

(2) a spectral system measuring a spectral intensity of incident light at a wavelength interval of 5 nm, for example, and approximating the color-matching function by weighted integration of the measured spectral intensities.

Among these systems, it is difficult to meet the precision requirements in the approximation with the system (1) due to a limitation on usable filters or a variation in filter characteristics. Therefore, the spectral system (2) is becoming dominant. In the spectral system, spectral means for acquiring a spectral intensity of incident light at each wavelengths is an essential element. A colorimeter often measuring non-constant light primarily uses a polychromater which comprises a wavelength-dispersing element and a sensor array and enables to simultaneously measure at all the wavelengths.

An example of the spectral system is known, as disclosed in Japanese Unexamined Patent Publication No. 2002-13981. The publication recites a multi-channel colorimeter having a relatively large wavelength interval of about several ten nm and a large half bandwidth in which a composite spectral sensitivity approximate to a specific spectral sensitivity is obtained by integrating spectral sensitivities of respective wavelength channels multiplied respectively by predetermined weights. The multi-channel colorimeter has various merits such as:

(a) the approximation precision of the spectral sensitivity is higher than that obtained by the filter system (1);

(b) a large amount of light incident into each wavelength channel and a high S/N ratio are obtainable because of the large half bandwidth; and (c) a silicon photodiode array having superior linearity, S/N ratio and dynamic range is usable due to relatively small number of wavelength channels, and accordingly, use of a charge transferring sensor array elements such as CCDs (solid-state image sensing elements) having poor performance in these parameters is avoidable.

The multi-channel colorimeter has the aforementioned various merits. However, the approximation error is not reduced enough for measuring the colorimetric property of monochromatic light from the aforementioned various displays, LEDs, or the like. In the conventional multi-channel colorimeter, the weighting factors are set in such a manner that an approximation error (difference) between a composite spectral sensitivity and a target color-matching function is minimized as a whole by a least-square method or a like technique, specifically, such that the sum of squares of a difference between the composite spectral sensitivity and the color-matching function recommended by the CIE at each wavelengths is minimized. In measuring the colorimetric property of the monochromatic light with use of the conventional multi-channel colorimeter, a composite spectral sensitivity which minimizes the approximation error as a whole is employed, despite the fact that part of the color-matching function, namely, merely the wavelength region where the monochromatic light has a certain intensity contributes to the measurement. Such a measurement may degrade the measurement precision, if the approximation precision in the wavelength region corresponding to the monochromatic light is low, despite the fact that the approximation precision as a whole is high.

SUMMARY OF THE INVENTION

In view of the problems residing in the prior art, an object of the present invention is to provide a multi-channel colorimeter that enables to measure the colorimetric property of incident light including light in a narrow wavelength region such as monochromatic light, with high precision suppressing measurement error.

An aspect of the present invention is directed to a multi-channel colorimeter comprising: a spectral means that separates light to be measured into components of different wavelengths; a photoelectric converter provided with multiple wavelength channels that receives the separated light to be measured according to the wavelengths and outputs the electric signals corresponding to received light at the respective wavelength channels; a calculating section that calculates colorimetric property of the light to be measured based on a composite spectral sensitivity which approximates a predetermined spectral sensitivity by integrating outputs from wavelength channels, multiplied by the respective predetermined weighting factors; and a special weighting factor generator that correctively sets the special weighting factors depending on a spectral intensity of the light to be measured.

Another aspect of the present invention is directed to a method for measuring colorimetric property of light to be measured comprising the steps of: separating the light to be measured into components of different wavelengths to receive the light to be measured through multiple wavelength channels; and calculating a spectral intensity of the light to be measured based on a composite spectral sensitivity which approximates a predetermined spectral sensitivity by integrating outputs from wavelength channels, multiplied by the respective predetermined weighting factors, wherein the weighting factors are set depending on the spectral intensity of the light to be measured.

These and other objects, features and advantages of the present invention will become more apparent upon reading of the following detailed description along with the accompanying drawings.

DETAILED DESCRIPTION OF THE PREFERRED EMBODIMENTS

In the following, a preferred embodiment of the present invention is described referring to the accompanying drawings.

(Description on Arrangement of Colorimeter)

Figure 1:
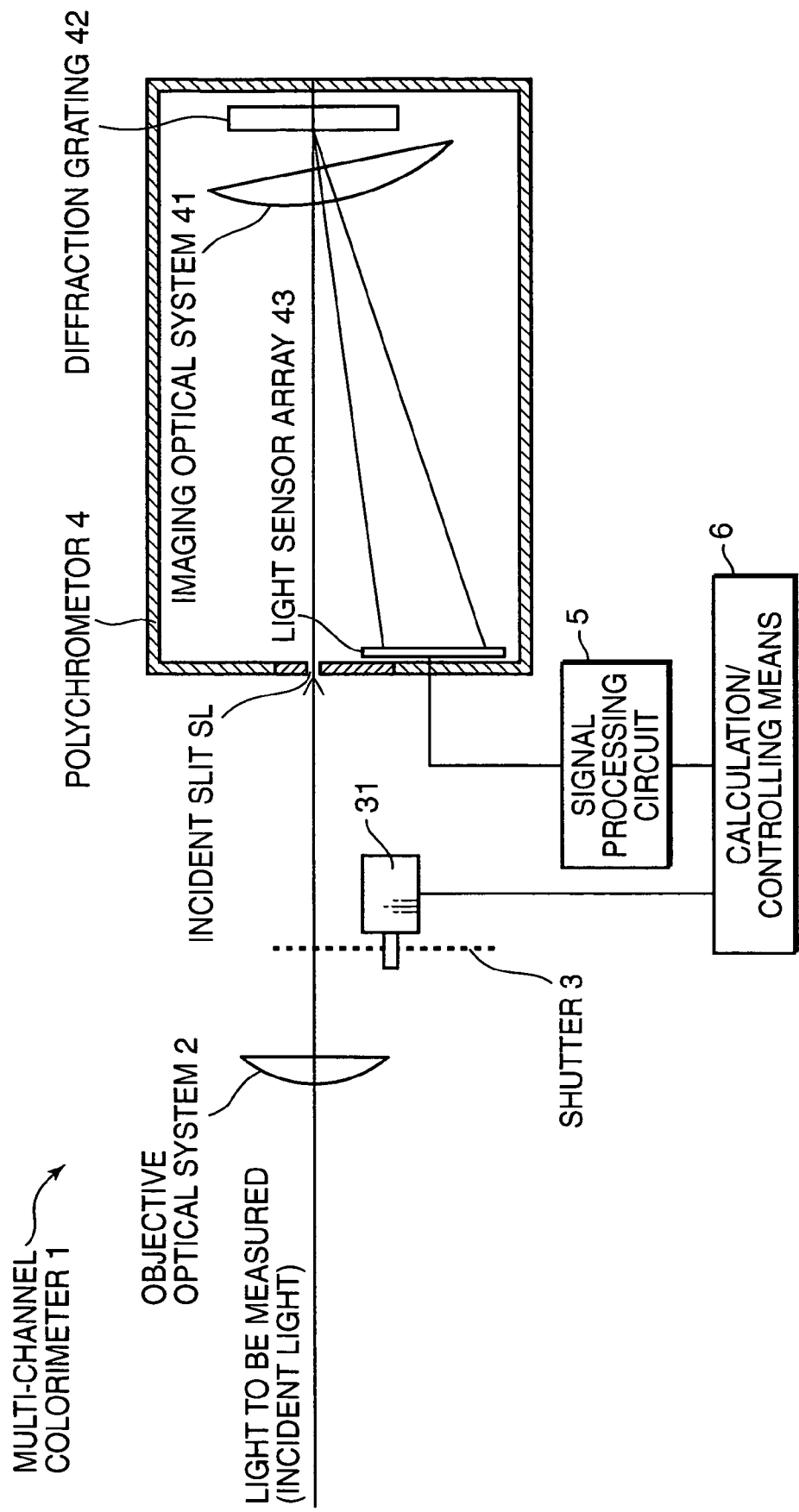
FIG. 1 is an illustration schematically showing essential parts of a multi-channel colorimeter as an embodiment of the present invention.

FIG. 1 is an illustration schematically showing essential parts of a multi-channel colorimeter 1 as an embodiment of the present invention. The multi-channel colorimeter 1 is provided with a objective optical system (objective lens) 2, a shutter 3, a shutter driving motor 31, a polychromater 4, a signal processing circuit 5, and a calculation/controlling means 6.

The objective lens 2 is adapted to guide light to be measured toward an incident slit SL formed in the polychromater 4. Examples of the light to be measured (incident light) include light emitted from a source and light reflected or transmitted from an illuminated sample. The arrangement in this embodiment is advantageous when accurately measuring the colorimetric property of light of a specific narrow wavelength region, particularly, light emitted from a monochromatic source such as a variety of displays or LEDs. The advantages will be described later in detail.

The shutter 3 is an opening/closing device having a function of closing an optical path, and is, for instance, a disc-like member having an opening part and a light blocking part. When the shutter 3 is opened, namely, the opening part of the shutter 3 is located in the optical path from the objective lens 2 to the incident slit SL of the polychromater 4, the light to be measured is incident into the polychromater 4 through the incident slit SL. On the other hand, when the shutter 3 is closed, namely, the light blocking part of the shutter 3 is located on the optical path, incidence of the light to be measured into the polychromater 4 is blocked. The shutter driving motor 31 drivingly opens/closes the shutter 3 based on a control signal outputted from the calculation/controlling means 6.

The polychromater 4 includes the incident slit SL, a collimator lens 41 serving as a imaging optical system, a diffraction grating 42 serving as a wavelength dispersing means, and a light sensor array 43 (photoelectric convertor).

The incident slit SL is a rectangular opening on a side wall of the polychromater 4. As described above, the light to be measured is introduced into the interior of the polychromater 4 through the incident slit SL. The collimator lens 41 guides the light to be measured that has passed through the incident slit SL onto the diffraction grating 42 as parallel rays, and focuses the light reflected and dispersed by the diffraction grating for projecting a dispersed image of the incident slit SL on the light receiving surface of the light sensor array 43.

Figure 2:
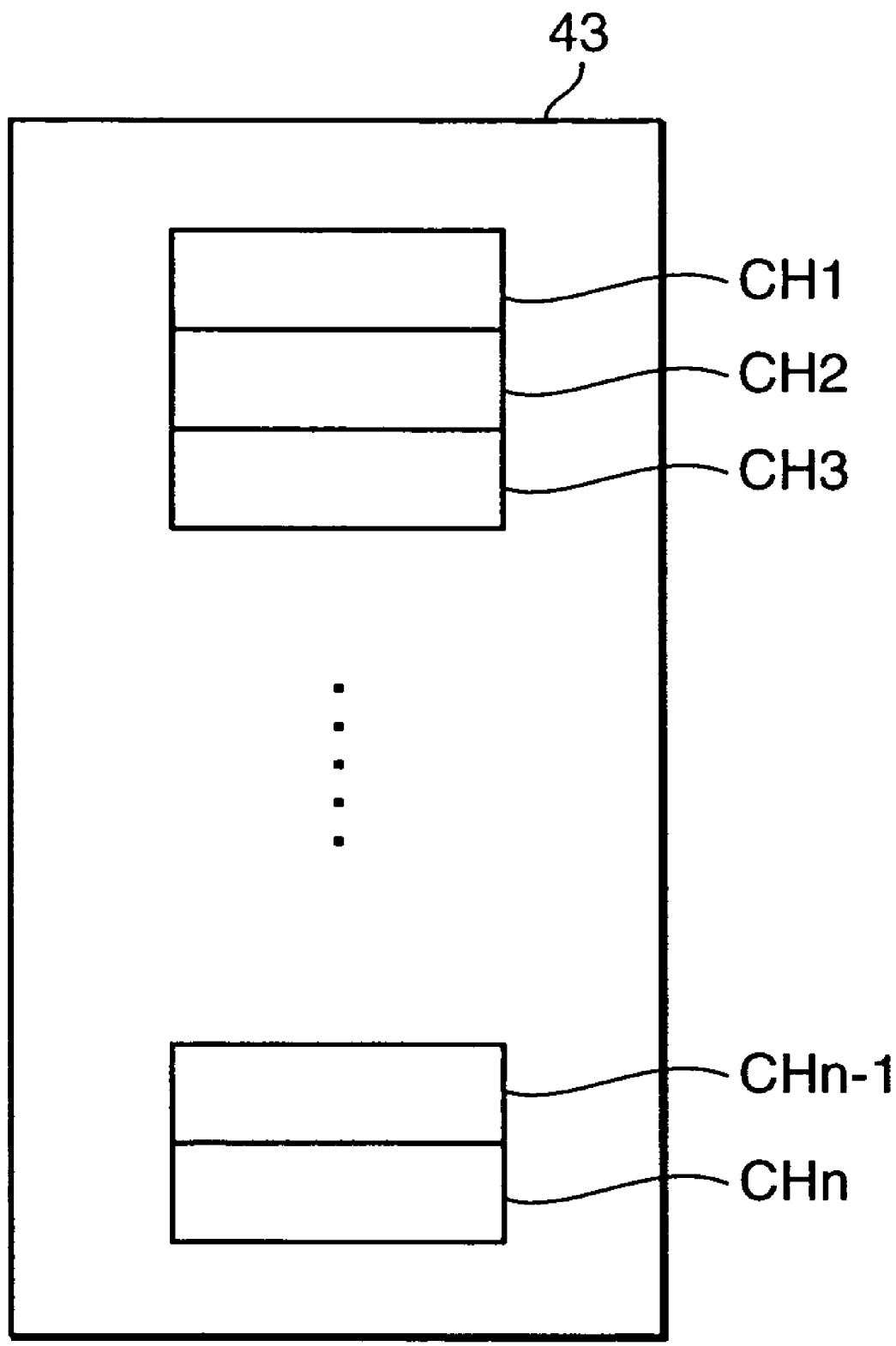
FIG. 2 is an illustration showing wavelength channels of a light sensor array.

The light sensor array 43 is provided with multiple wavelength channels (pixels) $CH_1$ through $CH_n$ (e.g., n=31, where n represents the number of pixels) arrayed at a predetermined interval. The wavelength channels $CH_k$ (k=1 through n, where k represents the pixel or channel number) comprise, for example, a silicon photodiode array in which a certain number of silicon photodiodes are arrayed in a vertical direction, as shown in FIG. 2, or alternatively, in both horizontal and vertical directions. The light dispersed with respect to the wavelengths is focused on the light receiving surface of the respective wavelength channel $CH_k$. Electrical signals corresponding to received light intensities which are outputted from the respective wavelength channels $CH_k$ (k=1 through n) are processed by the signal processing circuit 5 and the calculation/controlling means 6, so that the spectral intensity (and the colorimetric property based on the spectral intensity) of the light to be measured is measured.

Figure 3:
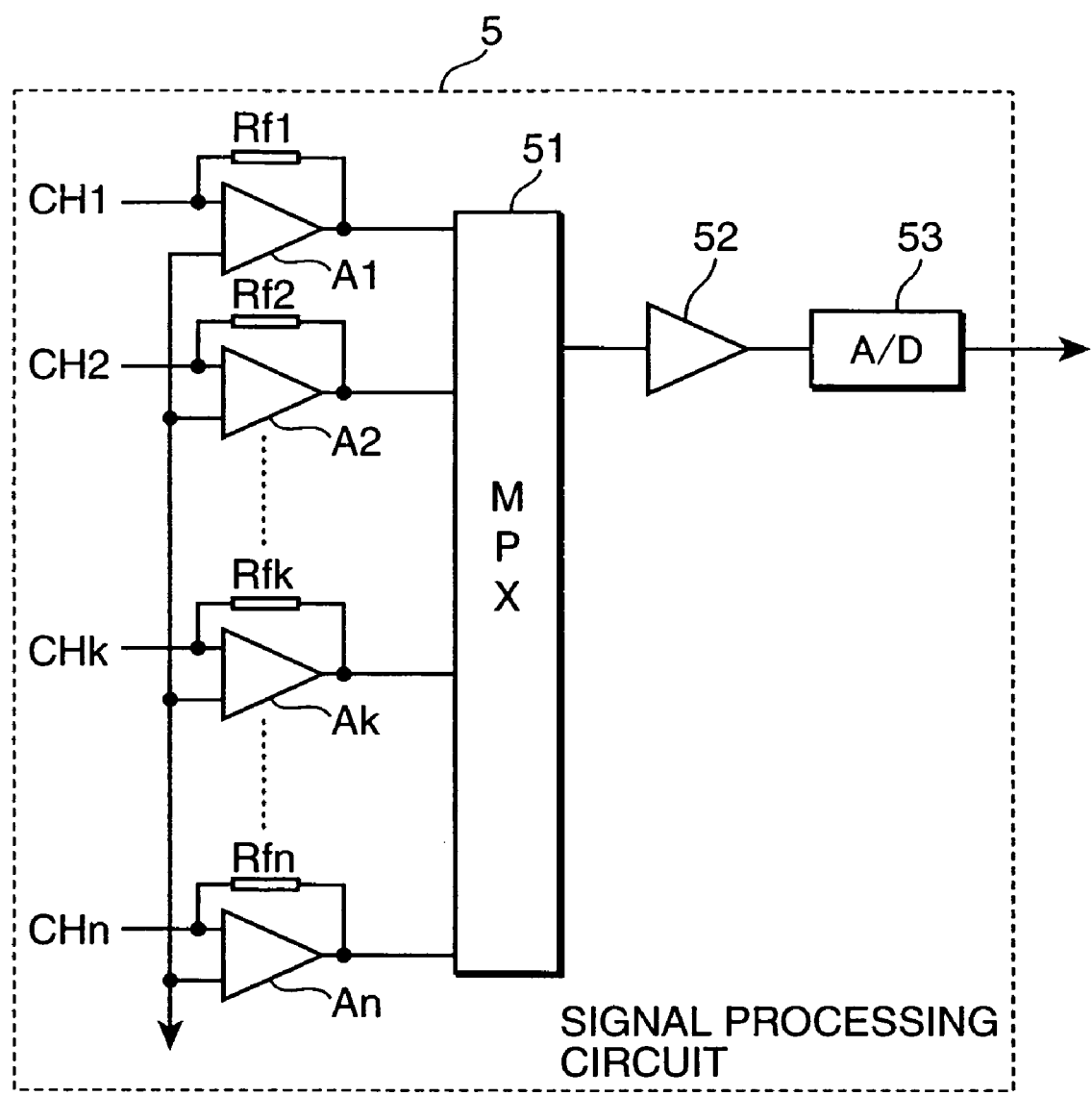
FIG. 3 is a block diagram showing a circuit arrangement of a signal processing circuit.

The signal processing circuit 5 amplifies and analog-to-digital converts the analog signals outputted from the respective wavelength channels $CH_1$ through $CH_n$. FIG. 3 is a block diagram showing the configuration of the signal processing circuit 5. The signal processing circuit 5 is provided with a current-voltage converting circuit $A_k$ including a feedback resistor $Rf_k$ for each of the wavelength channels $CH_k$. The signal processing circuit 5 is further provided with a multiplexer 51 for selectively and successively forwarding the outputs from the current-voltage converting circuits $A_k$, to a variable gain amplifier 52 for amplifying the output from the multiplexer 51, and an analog-to-digital converter 53 for converting the analog signal outputted from the variable gain amplifier 52 to a digital signal.

The dispersed rays (dispersed images of the incident slit SL) incident on the respective wavelength channels $CH_1$ through $CH_n$ of the sensor array 43 are converted to electric currents by the respective photodiodes of the sensor array 43, and then, converted to voltage signals by the corresponding current-voltage converting circuits $A_k$ connected to corresponding pixels $PD_k$. The voltage signals of the respective wavelength channels $CH_1$ through $CH_n$ outputted from the corresponding current-voltage converting circuits $A_k$ are successively and selectively forwarded by the multiplexer 51. The multiplexer 51 is controlled by the calculation/controlling means 6. The voltage signals are amplified by the variable gain amplifier 52, and sent to the calculation/controlling means 6 after being converted to digital signals by the analog-to-digital converter 53.

Figure 4:
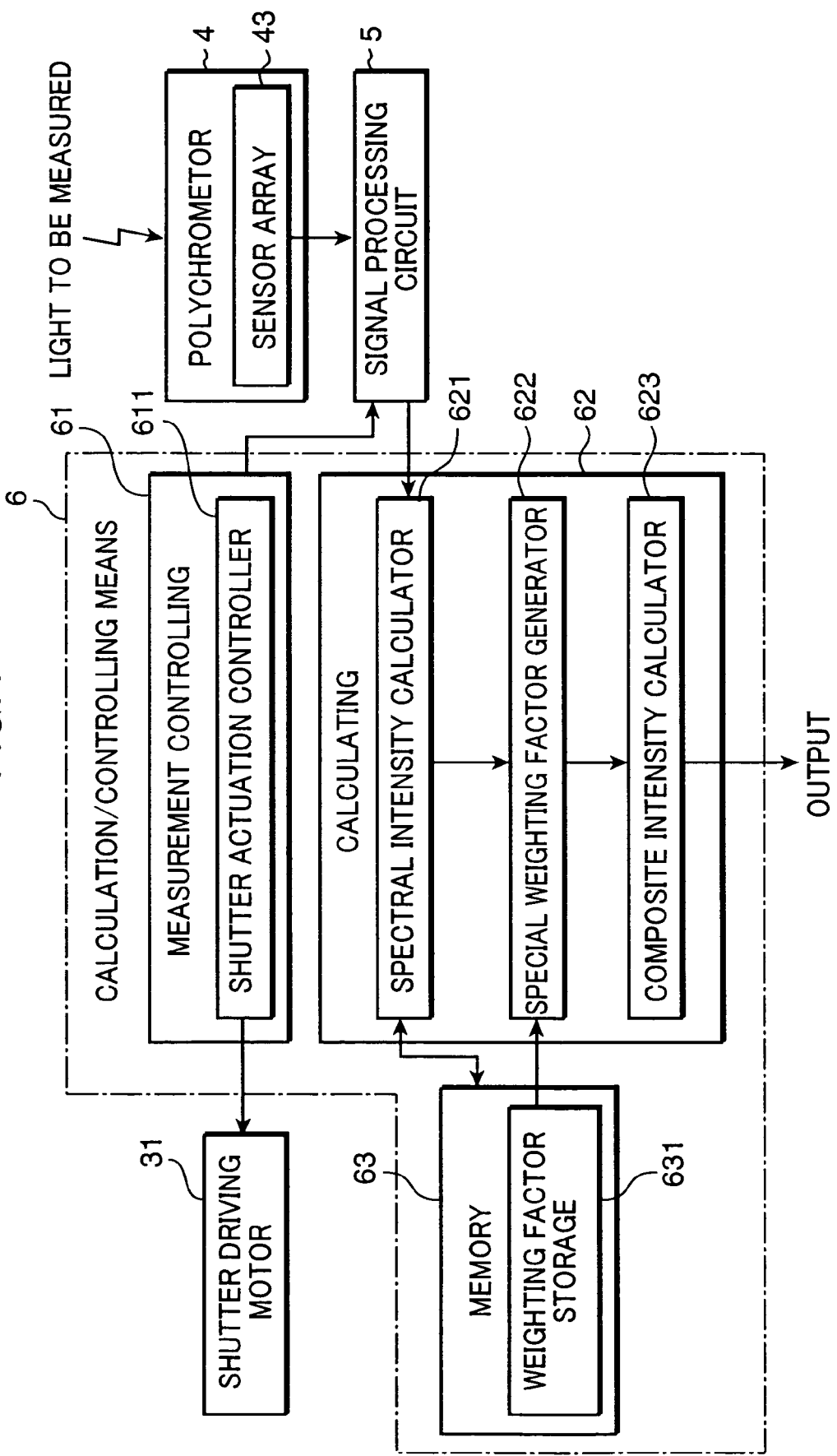
FIG. 4 is a functional block diagram of calculation/controlling means.

The calculation/controlling means 6 is constituted of, e.g., a central processing unit (CPU) and an electronically erasable and programmable read only memory (EEPROM), and is adapted to control the overall operation of the multi-channel colorimeter 1. Specifically, the calculation/controlling means 6 controls the respective parts of the colorimeter 1 to measure the spectral intensity of the light to be measured, and performs a predetermined computation to obtain the colorimetric property of the light with use of a predetermined spectral sensitivity. FIG. 4 is a functional block diagram of the calculation/controlling means 6. The calculation/controlling means 6 includes a measurement controlling section 61, a calculating section 62, and a memory section 63.

The measurement controlling section 61 sends a control signal to the respective parts of the colorimeter 1 in measuring spectral characteristics of the light to be measured so as to control a measuring operation of the colorimeter 1. For instance, a shutter actuation controller 611 of the measurement controlling section 61 drives the shutter driving motor 31 to open the shutter 3 in measurement, so that the light to be measured that has passed through the objective lens 2 is incident in the incident slit SL of the polychromater 4. On the other hand, the shutter actuation controller 611 drives the shutter driving motor 31 to close the shutter 3 in measuring an offset signal, which will be described later, so that incidence of the light to be measured is blocked. The measurement controlling section 61 sends a control signal to the signal processing circuit 5 to control the selective operation of the multiplexer 51.

The calculating section 62 calculates the spectral intensity of the light to be measured incident on the light sensor array 43, and the colorimetric property of the light based on a composite spectral sensitivity which approximates a predetermined spectral sensitivity, by integrating the outputs from wavelength channels $CH_1$ through $CH_n$, multiplied by the predetermined respective weighting factors. The calculating section 62 includes a spectral intensity calculator 621, a special weighting factor generator 622, and a composite intensity calculator 623 for composing a spectral intensity based on a composite spectral sensitivity.

The spectral intensity calculator 621 receives outputs from the respective wavelength channels $CH_1$ through $CH_n$ of the light sensor array 43, on which a dispersed image of the incident slit SL is projected, as digital signal data from the signal processing circuit 5 and temporarily stores the digital signal data in a RAM or a like device of the memory section 63 during measurement (when the shutter 3 is opened). Subsequently, when the shutter 3 is closed for measuring an offset signal, the spectral intensity calculator 621 receives digital signal data (offset signal) which are outputted from the signal processing circuit 5 while incidence of the light to be measured is blocked. The spectral intensity calculator 621 calculates spectral characteristics of the light to be measured at the respective wavelength channels $CH_k$ after offset removal, by subtracting the respective offset signal from the received measurement data. Further, spectral intensity data $I_k$ at the respective wavelength channels $CH_k$ are obtained by performing sensitivity correction, which will be described later.

The special weighting factor generator 622 sets optimum weighting factors for the light to be measured, based on the spectral intensity data $I_k$ of the light which have been calculated by the spectral intensity calculator 621. The procedure is performed in such a manner that general weighting factors $Gx_k$, $Gy_k$, $Gz_k$ for approximating the theoretical color-matching functions $x(\lambda)$, $y(\lambda)$, $z(\lambda)$ stored in the weighting factor storage 631 of the memory section 63 in advance, are corrected to special weighting factors $Sx_k$, $Sy_k$, $Sz_k$ optimized for the light to be measured based on the spectral intensity data $I_k$.

The composite intensity calculator 623 caluculates X', Y', Z' values (composite intensities) which approximate theoretical tristimulus values X, Y, Z by integrating the spectral intensity data $I_k$ multiplied by the special weighting factors $Sx_k$, $Sy_k$, $Sz_k$ which are set by the special weighting factor generator 622. The aforementioned theoretical tristimulus values X, Y, Z are obtained based on the color-matching functions $x(\lambda)$, $y(\lambda)$, $z(\lambda)$ defined by the CIE, respectively.

The memory section 63 includes a ROM and a RAM, and is adapted to store a control program used for measurement or the like, and to temporarily store the measurement data or the like which is supplied from the signal processing circuit 5. The weighting factor storage 631 of the memory section 63 stores the general weighting factors $Gx_k$, $Gy_k$, $Gz_k$ which are not dependent on the spectral intensity of the incident light, and are set based on the spectral sensitivities of the respective wavelength channels $CH_1$ through $CH_n$, which have been measured in producing the colorimeter 1. The general weighting factors $Gx_k$, $Gy_k$, $Gz_k$ are used as initial values for obtaining the special weighting factors $Sz_k$, $Sy_k$, $Sz_k$. The memory section 63 also stores calibration factors acquired by the spectral intensity calculator 621 for correcting the sensitivity variation.

(Description on Operation)

Figure 5:
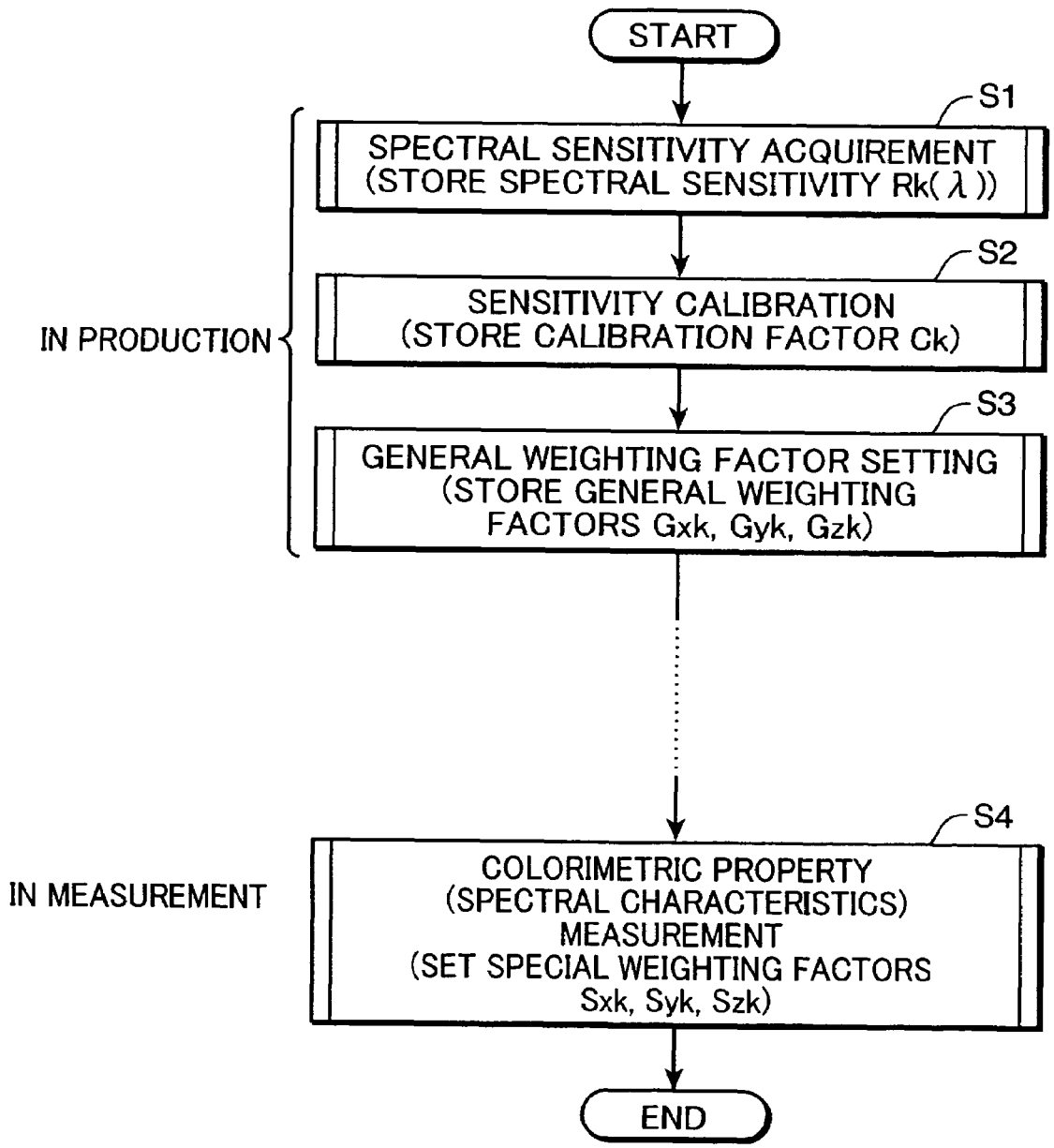
FIG. 5 is a flowchart showing an overall operation of the multi-channel colorimeter.

Next, the operations of the multi-channel colorimeter 1 having the abovementioned arrangement is described. FIG. 5 is a flowchart showing the operation of the multi-channel colorimeter 1. The operation is separated into three operation steps (operation steps for various settings) to be implemented in production, and an operation step to be implemented in measuring the colorimetric property of the light to be measured. During production of the colorimeter 1, steps for spectral sensitivity acquirement (Step S1), sensitivity calibration (Step S2), and general weighting factor setting (Step S3) are executed.

In the spectral sensitivity acquirement of Step S1, spectral sensitivities $R_k(\lambda)$ of the respective wavelength channels $CH_k$ (k=1 through n) of the sensor array 43 are obtained and, are stored in the memory section. In the sensitivity calibration of Step S2, calibration factors $C_k$ are obtained to compensate sensitivity variations among respective wavelength channels $CH_k$ and, are stored in the memory section 63. Further, in the general weighting factor setting of Step S3, the general weighting factors $Gx_k$, $Gy_k$, $Gz_k$ for composing the color-matching functions $x(\lambda)$, $y(\lambda)$, $z(\lambda)$ defined by the CIE are determined with use of the spectral sensitivities $R_k(\lambda)$ acquired in Step S1, and are stored in the weighting factor storage 631. In measuring the colorimetric property of the light to be measured (Step S4), the special weighting factors $Sx_k$, $Sy_k$, $Sz_k$ are generated by optimizing the general weighting factors $Gx_k$, $Gy_k$, $Gz_k$ as initial values to the spectral characteristics of the light to be measured, and the tristimulus values X', Y', Z' approximating to the theoretical tristimulus values X, Y, Z obtained according to the color-matching functions $x(\lambda)$, $y(\lambda)$, $z(\lambda)$ defined by the CIE. In the following, the respective steps will be described one by one.

(Step S1: Spectral Sensitivity Acquirement)

Figure 6:
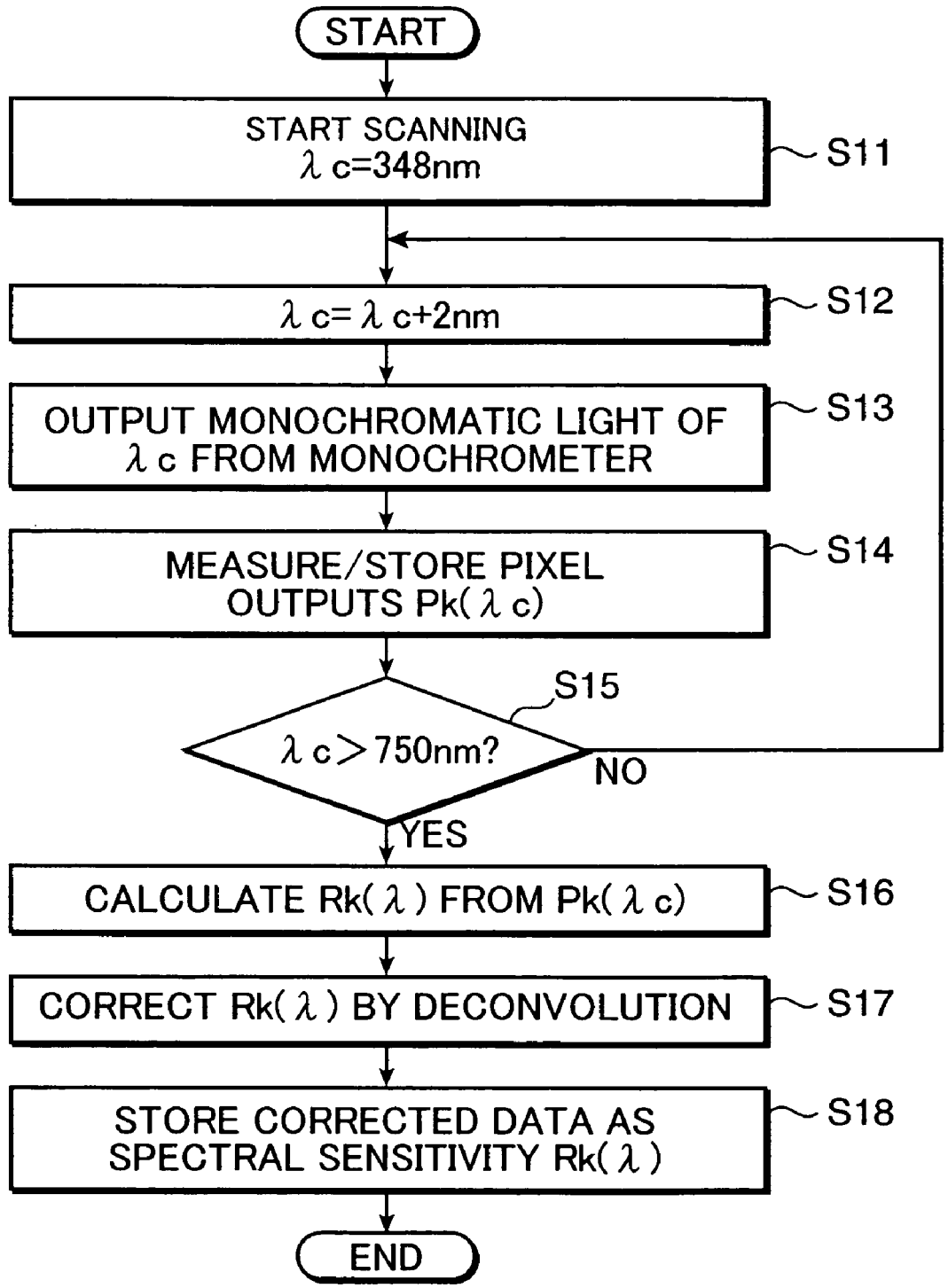
FIG. 6 is a flowchart showing a spectral sensitivity acquiring operation of the colorimeter.

FIG. 6 is a flowchart showing a flow of the spectral sensitivity acquirement. In this embodiment, the spectral sensitivities of the respective wavelength channels $CH_k$ (k=1 through n) of the sensor array 43 are measured by receiving reference monochromatic light incident in the multi-channel colorimeter 1 successively while shifting the wavelength stepwise. The measurement is, for example, conducted by arranging a reference monochromater opposingly to the objective lens 2, which emits monochromatic light of a constant energy and a half bandwidth of about 2 nm to be incident in the multi-channel colorimeter 1 successively at a wavelength interval of 2 nm (scanning pitch=2 nm). The range of the wavelength scanning is determined to be from 350 to 750 nm, for instance, so that spectral sensitivities $R_1(\lambda)$ and $R_n(\lambda)$ of the wavelength channels $CH_1$ and $C_n$ at the both ends in a measurement range from, e.g., 400 to 700 nm are securely covered.

In the above case, as shown in the flowchart of FIG. 6, $\lambda c=348$ nm is set as the initial value of wavelength scan (Step S11), the center wavelength $\lambda c$ of the monochromatic light to be emitted for the first time is determined after an addition routine (Step S12) implementing $\lambda c=\lambda c+2$ nm according to the scanning pitch of 2 nm, and then, the monochromatic light of $\lambda c=350$ nm is emitted from the monochromater (Step S13). When the monochromatic light of $\lambda c=350$ nm is incident into the polychromater 4 through the incident slit SL, signals from the respective pixels of the sensor array 43 are sent to the calculation/controlling means 6 as outputs $P_k$ (350) of the respective wavelength channels $CH_k$ (k=1 through n) with respect to the center wavelength $\lambda c=350$ nm, and are temporarily stored in the memory section 63 in correlation with the center wavelength $\lambda c=350$ nm (Step S14). Then, it is judged whether the center wavelength $\lambda c$ exceeds 750 nm (Step S15). The operations from Step S11 to Step S14 are cyclically repeated with a scanning pitch of 2 nm until the central wavelength $\lambda c$ exceeds 750 nm (YES in Step S15).

Figure 7:
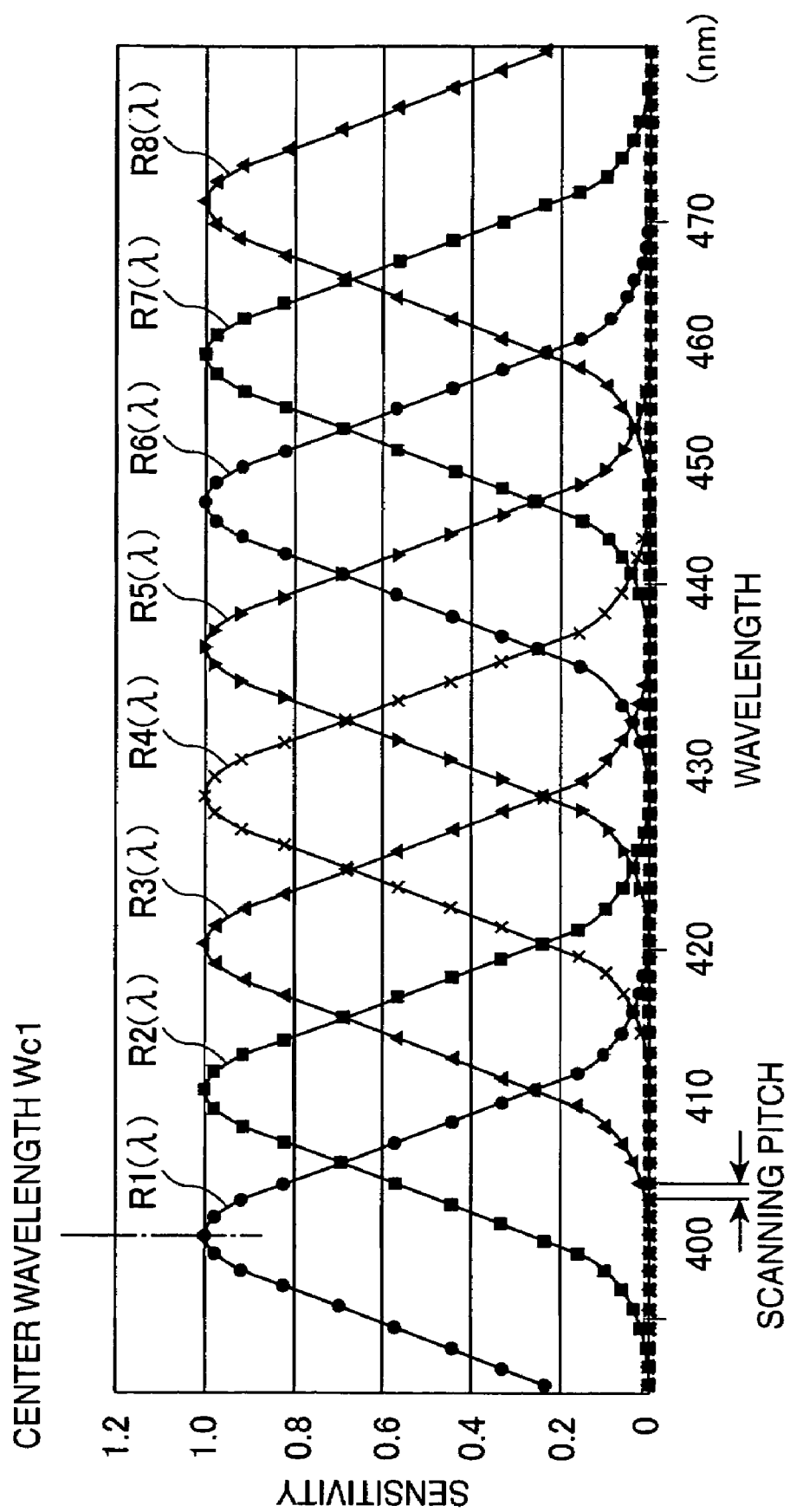
FIG. 7 is a graph showing relative spectral sensitivities of the respective wavelength channels.

With the aforementioned procedure the wavelength range from 350 to 750 nm is covered, and from the pixel outputs $P_k(\lambda c)$ at the central wavelength $\lambda c$, the relative spectral sensitivities $R_k(\lambda)$ of the respective wavelength channels $CH_k$ exemplarily shown in FIG. 7 are obtained (Step S16). FIG. 7 where the axis of abscissa denotes the wavelength, shows the eight relative spectral sensitivities $R_1(\lambda)$ through $R_8(\lambda)$ for wavelength channels $CH_1$ through $CH_8$. It should be noted, however, that the relative spectral sensitivities $R_k$ for all the wavelength channels $CH_k$ (in this example, k=1 through 31 in the wavelength region from $\lambda=350$ to 750 nm) are obtained in actual case.

In the case where the half bandwidth (2 nm) of the monochromatic light to be incident in the polychromater 4 may influence the accuracy, the pixel outputs $P_k(\lambda c)$ are corrected with use of a known deconvolution technique, and if resolution finer than 2 nm is required, the data are interpolated (Step S17). The relative spectral sensitivities $R_k(\lambda)$ obtained based on the pixel outputs $P_k(\lambda c)$ after the aforementioned correction and interpolation if necessary are stored in the memory section 63 with respect to the respective wavelength channels $CH_1$ through $CH_n$ (Step S18). The general weighting factors $Gx_k$, $Gy_k$, $Gz_k$, which will be described later, are obtained as weightings for the relative spectral sensitivities $R_k(\lambda)$. Further, center wavelengths $Wc_k$ of the respective wavelength channels $CH_1$ through $CH_n$ are calculated based on the relative spectral sensitivities $R_k(\lambda)$.

(Step S2: Sensitivity Calibration)

Figure 8:
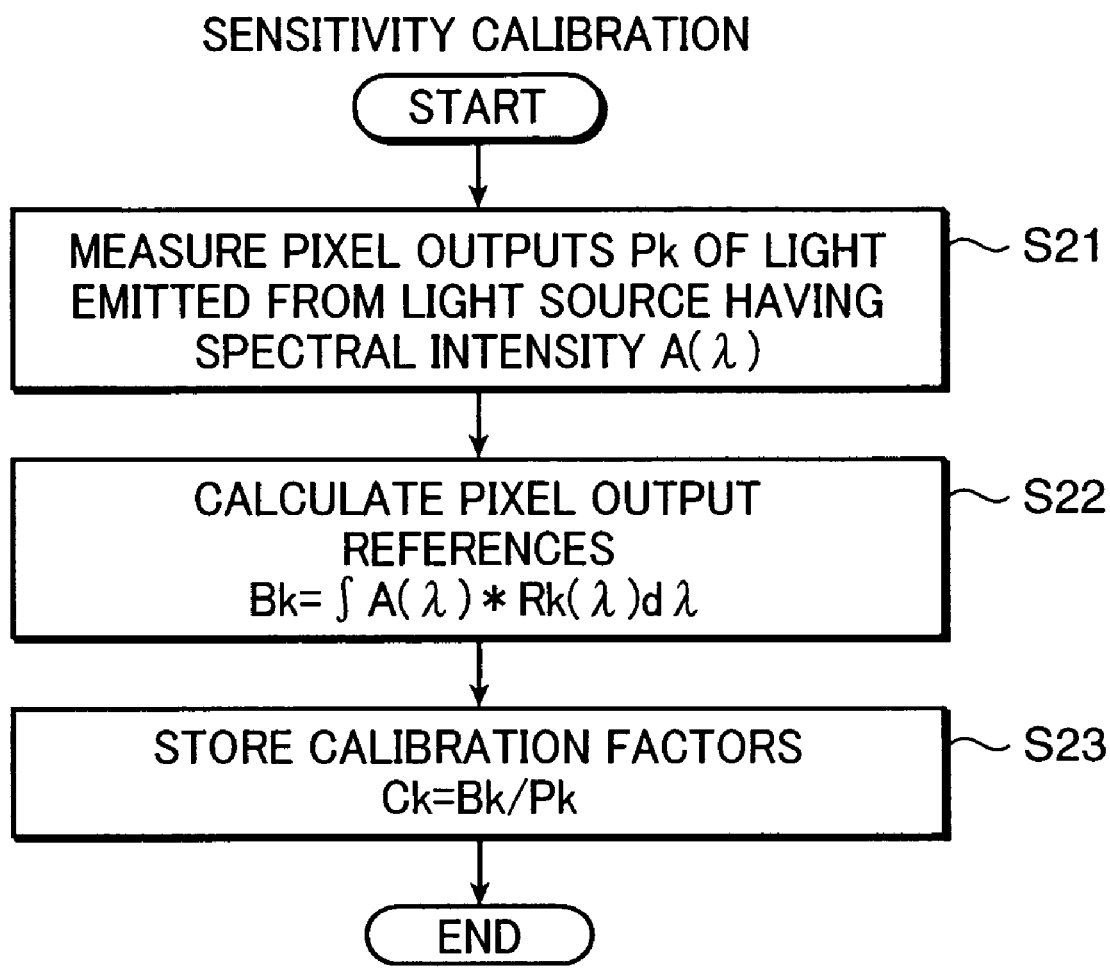
FIG. 8 is a flowchart showing a sensitivity calibration operation of the colorimeter.

FIG. 8 is a flowchart showing a flow of the sensitivity calibration. The general weighting factors $Gx_k$, $Gy_k$, $Gz_k$ are generated to the relative spectral sensitivities $R_k(\lambda)$ with the normalized peak. However, as the sensitivities of the respective pixels of the sensor array 43 are not uniform, and a gain of the variable gain amplifier 52 in the signal processing circuit 5 is not uniform among the wavelength channels, a sensitivity calibration is necessary. In this step, a calibration factor $C_k$ is generated to compensate the sensitivity variation and gain variation.

Generally, energy of the monochromatic light emitted from the reference monochromater, as employed in the spectral sensitivity calibration of Step S1 are not constant enough for precise sensitivity calibration. Accordingly, in sensitivity calibration, an incandescent light source (hereinafter, called as "calibration light source") having a known spectral intensity $A(\lambda)$ is used. A light from the calibration light source is incident into the polychromater 4 through the incident slit SL to measure pixel outputs $P_k$ of the pixels of the sensor array 43 (Step S21).

Pixel output references $B_k$ are calculated according to the following equation (1) based on the spectral sensitivities $R_k(\lambda)$ of the respective wavelength channels which have been stored in the memory section 63, and the known spectral intensity $A(\lambda)$ of the calibration light source (Step S22).

$$B_k = \int A(\lambda) \cdot R_k(\lambda) d\lambda \qquad (1)$$

Then, the calibration factor $C_k$ is so determined for each of the wavelength channels by implementing the equation (2), that the pixel output references $B_k$ coincide with the corrected outputs $C_k \cdot P_k$ of the respective wavelength channels with respect to the calibration light source (Step S23).

$$C_k = B_k / P_k \qquad (2)$$

The calculated calibration factors $C_k$ are stored in the memory section 63, and utilized for sensitivity compensation in actually measuring the colorimetric property of the light to be measured.

(Step S3: General Weighting Factor Generation)

Figure 9:
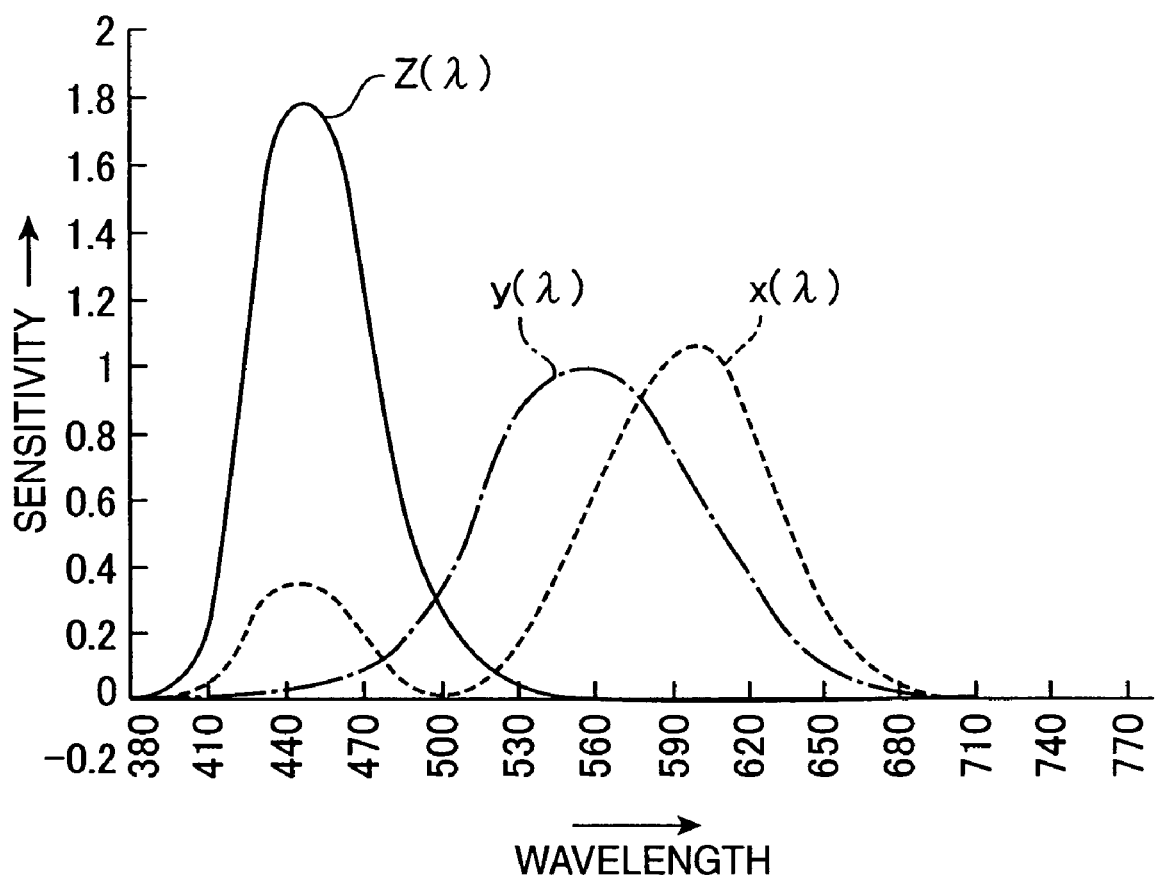
FIG. 9 is a graph showing spectral sensitivities or color-matching functions $x(\lambda)$, $y(\lambda)$, and $z(\lambda)$ of 10 degree standard observer, as defined by the CIE.

The general weighting factors $Gx_k$, $Gy_k$, $Gz_k$ are weighting factors that are not dependent on the spectral intensity of the light to be measured, and are set in producing the colorimeter 1 after implementing the spectral sensitivity acquirement of Step S1 and the sensitivity calibration of Step S2. FIG. 9 shows the spectral sensitivities (color-matching functions) $x(\lambda)$, $y(\lambda)$, $z(\lambda)$ of 10 degree observer defined by the CIE. The general weighting factors $Gx_k$, $Gy_k$, $Gz_k$ are so determined that the composite spectral sensitivities obtained by integrating the relative spectral sensitivities $R_k(\lambda)$ of the respective wavelength channels $CH_k$ obtained in Step S1, weighted thereby approximate the predetermined theoretical spectral sensitivities $x(\lambda)$, $y(\lambda)$, $z(\lambda)$.

Figure 11:
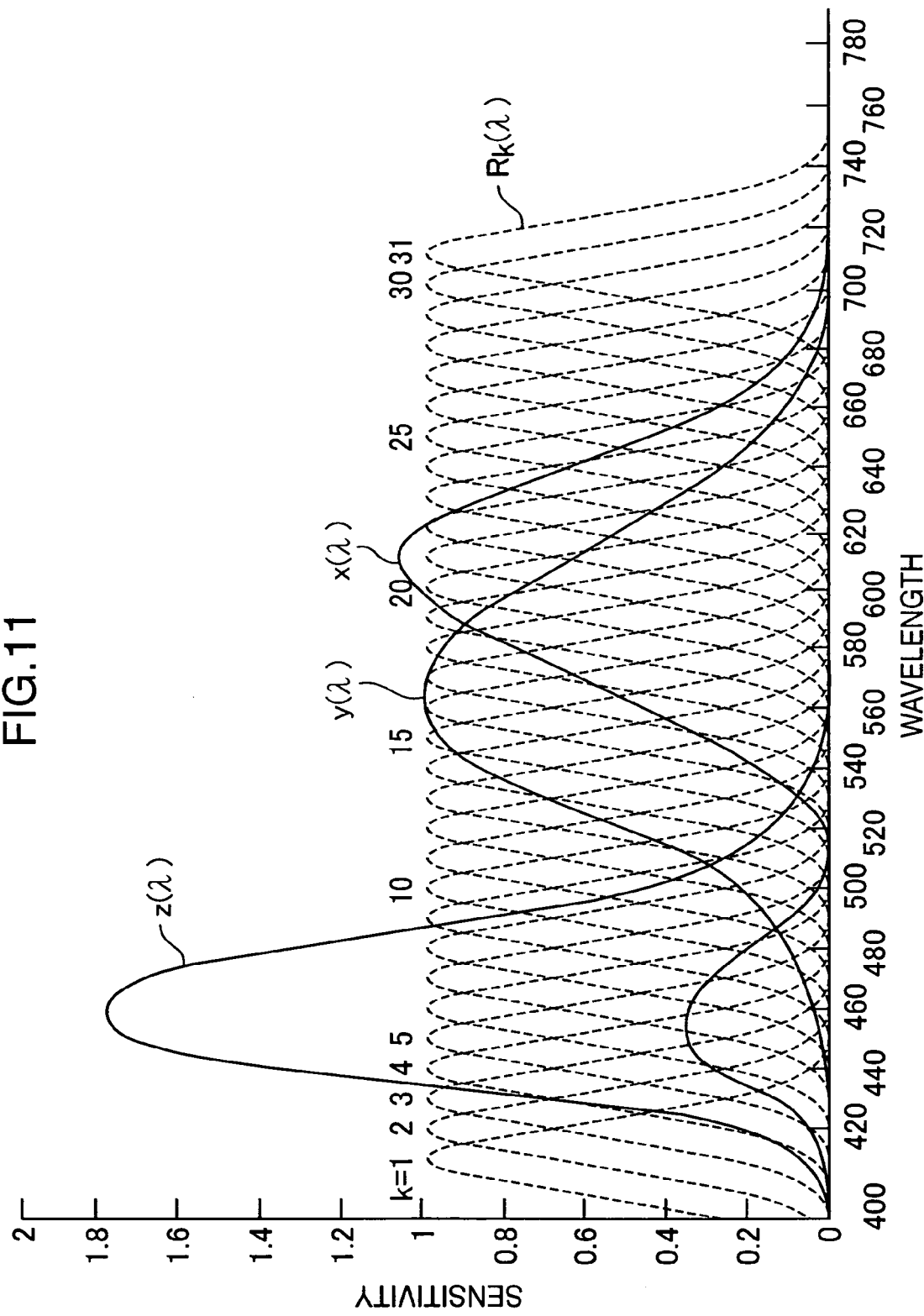
FIG. 11 is a graph for explaining a procedure in calculating the spectral sensitivity.

Next, the procedure for composing the color-matching function $z(\lambda)$ is exemplarily described. In principle, a composite spectral sensitivity $zg(\lambda)$ approximate to the predetermined color-matching function $z(\lambda)$ is obtained by multiplying the relative spectral sensitivities $R_k(\lambda)$ (k=1 through 31) of the respective wavelength channels $CH_k$ (k=1 through 31 in FIG. 11) by the corresponding weighting factors $Gz_k$, which are different among the wavelength channels, and integrating the products. As is obvious from FIG. 11, the weighting factors $Gz_k$ are large around the k=6 where is the peak of the color-matching function $z(\lambda)$ and gradually diminishing toward the both ends thereof, to be substantially 0 at k>16. The weighting factors $Gz_k$ are obtained by a least square method or the like, so that a difference between the composite spectral sensitivity $zg(\lambda)$ and the target spectral sensitivity $z(\lambda)$ is minimized. Similarly, the weighting factors $Gx_k$, $Gy_k$ (k=1 through 31) are so determined that a difference between a composite spectral sensitivity $xg(\lambda)$ and the target spectral sensitivity $x(\lambda)$, and a difference between a composite spectral sensitivity $yg(\lambda)$ and the target spectral sensitivity $y(\lambda)$ are minimized, respectively.

Figure 10:
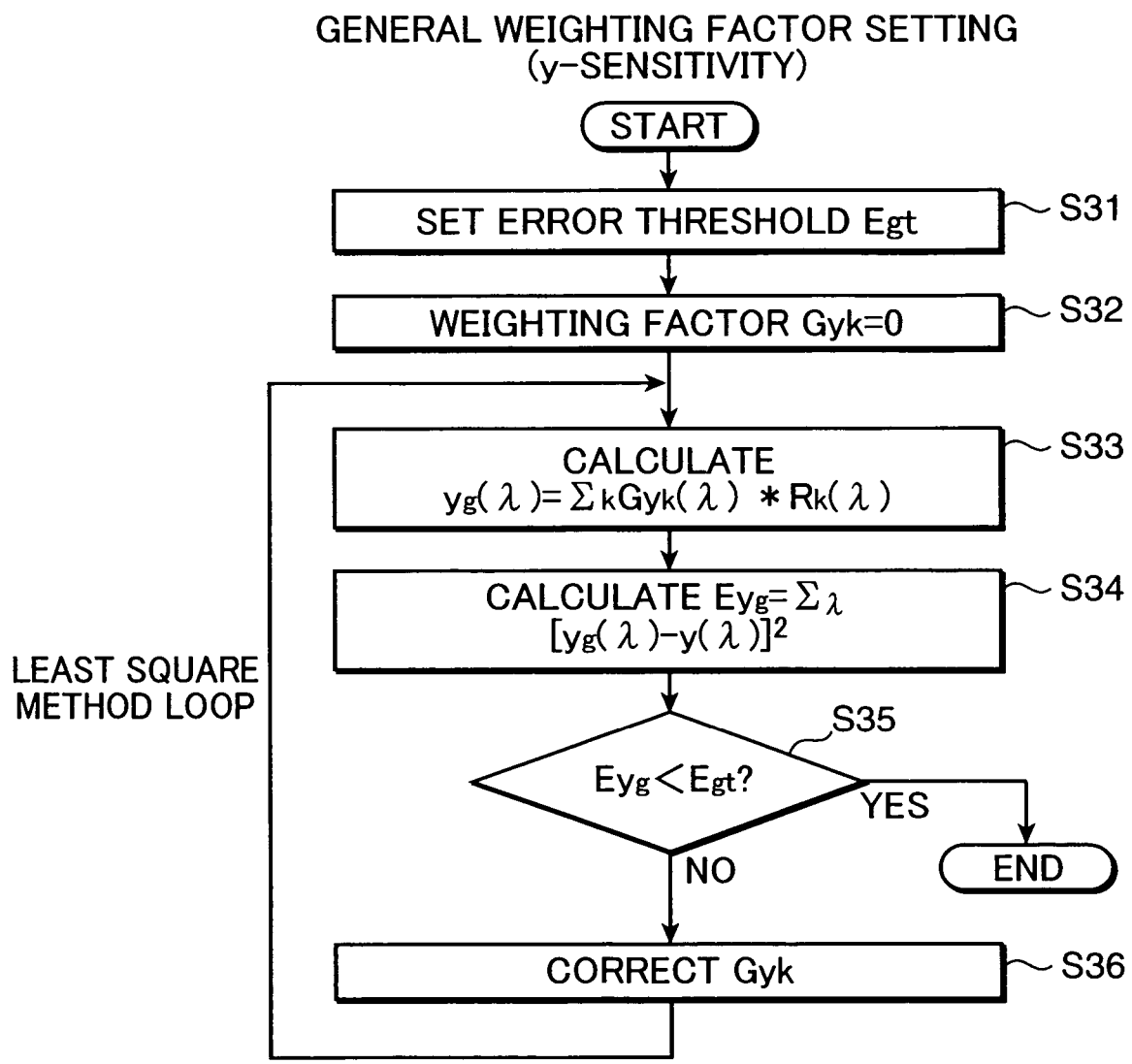
FIG. 10 is a flowchart showing a general weighting factor setting operation of the colorimeter.

FIG. 10 is a flowchart exemplarily showing a routine of determining (calculating) the weighting factor $Gy_k$ for y-sensitivity. It should be noted that the weighting factors $Gx_k$, $Gz_k$ are determined (calculated) individually in the similar manner as the weighting factor $Gy_k$. Referring to FIG. 10, first, a predetermined error threshold Egt is set (Step S31). The error threshold Egt is set for securing a necessary precision, and is a target value within which the residual approximation error should be.

After setting $Gx_k$, $Gy_k$, $Gz_k=0$ as initial values of the general weighting factors (Step S32), the flow enters an optimizing routine (least square method loop). Therein, the general weighting factors $Gx_k$, $Gy_k$, $Gz_k$ are so optimized by a least square method that general composite spectral sensitivities $xg(\lambda)$, $yg(\lambda)$, $zg(\lambda)$ calculated by the following equations (3-1), (3-2), (3-3) approximate the theoretical color-matching function (spectral sensitivity) $x(\lambda)$, $y(\lambda)$, $z(\lambda)$, as shown in FIG. 9, respectively. In the respective equation (3-1), (3-2), (3-3), the general weighting factors $Gx_k$, $Gy_k$, $Gz_k$ are correlated with the spectral sensitivities $R_k(\lambda)$ of the respective pixels obtained in Step S1.

$$xg(\lambda)=\Sigma_k Gx_k \cdot R_k(\lambda) \quad (3\text{-}1)$$

$$yg(\lambda)=\Sigma_k Gy_k \cdot R_k(\lambda) \quad (3\text{-}2)$$

$$zg(\lambda)=\Sigma_k Gz_k \cdot R_k(\lambda) \quad (3\text{-}3)$$

Specifically, the general weighting factors of the respective wavelength channels $CH_k$ are individually corrected to new $Gx_k 1$, $Gy_k 1$, $Gz_k 1$ and the general composite spectral sensitivities $xg(\lambda)$, $yg(\lambda)$, $zg(\lambda)$ is obtained again by implementing the equations (3-1), (3-2), (3-3), respectively (Step S33). Then, evaluation function Exg, Eyg, Ezg, which are sum of squares of differences between the general composite spectral sensitivities $xg(\lambda)$, $yg(\lambda)$, $zg(\lambda)$ obtained in Step S33, and the respective target color-matching functions (spectral sensitivities) $x(\lambda)$, $y(\lambda)$, $z(\lambda)$ at the respective wavelengths, are calculated by implementing the equations (4-1), (4-2), (4-3), respectively (Step S34).

$$Exg=\Sigma_\lambda [xg(\lambda)-x(\lambda)]^2 \quad (4\text{-}1)$$

$$Eyg=\Sigma_\lambda [yg(\lambda)-y(\lambda)]^2 \quad (4\text{-}2)$$

$$Ezg=\Sigma_\lambda [zg(\lambda)-z(\lambda)]^2 \quad (4\text{-}3)$$

Subsequently, the sums Exg, Eyg, Ezg calculated in Step S34, and the error threshold Egt set in Step S31 are compared (Step S35). If the sums Exg Eyg, Ezg exceed the error threshold Egt (NO in Step S35), the general weighting factors $Gx_k 1$, $Gy_k 1$, $Gz_k 1$ used in the above-stated calculation are further corrected to the new $Gx_k 2$, $Gy_k 2$, $Gz_k 2$ (Step S36). Thereafter, the process returns to Step S33 to repeat the least square method loop.

Specifically, the general weighting factors $Gx_k$, $Gy_k$, $Gz_k$ are so determined by the least square method that the square sums Exg, Eyg, Ezg calculated by the equations (4-1), (4-2), (4-3), as evaluation functions, do not exceed the error threshold Egt. After obtaining the general weighting factors $Gx_k$, $Gy_k$, $Gz_k$ which satisfy the above condition (YES in Step S35), the general weighting factors $Gx_k$, $Gy_k$, $Gz_k$ are stored in the weighting factor storage 631 of the memory section 63. The above steps are executed during initial setting for the individual multi-channel colorimeter 1 in the production process. Alternatively, error thresholds Egt may be set respectively to the respective targeted color-matching functions $x(\lambda)$, $y(\lambda)$, $z(\lambda)$.

(Step S4: Measurement Flow)

Figure 12:
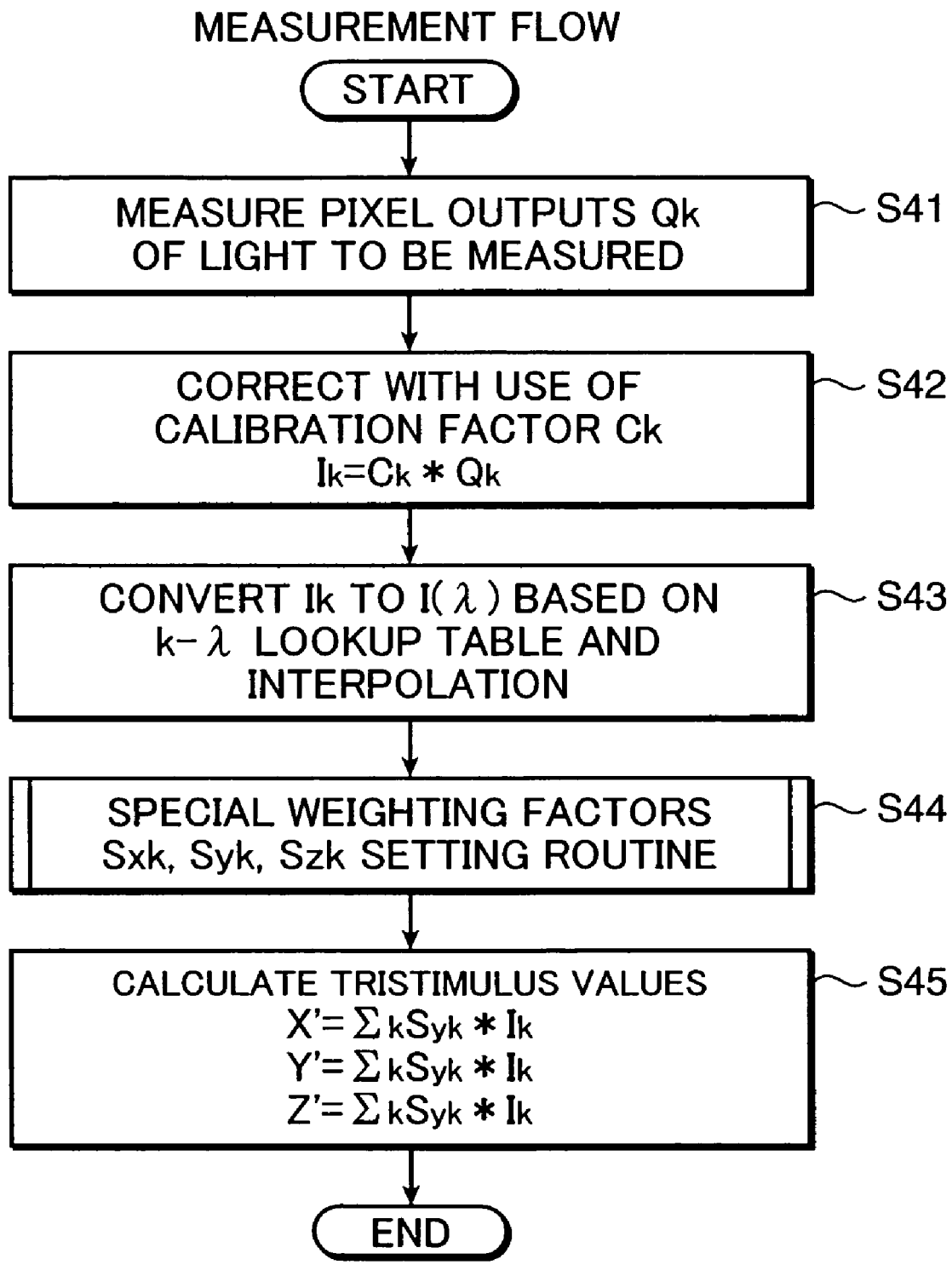
FIG. 12 is a flowchart showing a measurement operation of the colorimeter.

Next, described is an operation in measuring the colorimetric property of the light to be measured with use of the multi-channel colorimeter 1 as the embodiment of the present invention. FIG. 12 is a flowchart showing the measuring operation of the colorimeter 1. In the measurement, the multi-channel colorimeter 1 is opposingly arranged to a source of light to be measured. In response to "start of measurement" signal entered through an operating section (not shown) of the colorimeter 1, the shutter actuation controller 611 (see FIG. 4) of the calculation/controlling means 6 opens the shutter 3 to let the light to be measured enter into the polychromater 4 through the incident slit SL. At this time, signals (pixel outputs) from the respective wavelength channels $CH_k$ (k=1 through n) of the sensor array 3 are sent from the signal processing circuit 5 to the spectral intensity calculator 621 of the calculating section 62 (Step S41). The multi-channel colorimeter 1 according to the present embodiment is advantageous in precision as compared with the conventional instrument, in the case when light within a specific narrow wavelength band, particularly, monochromatic light emitted from an LED or a like device is measured.

The spectral intensity calculator 621 corrects the received pixel outputs $Q_k$ to spectral intensity data $I_k$ by implementing the equation (5) with use of the calibration coefficients $C_k$ which have been calculated in Step S2 of FIG. 5 and stored in the memory section 63 (Step S42).

$$I_k=C_k \cdot Q_k \quad (5)$$

Subsequently, each of the spectral intensity data $I_k$ is converted to a spectral intensity $I(\lambda)$ by using a correlation table between the respective wavelength channels $CH_k$ (k=1 through n) or pixels $PD_k$, and the center wavelength $Wc_k$ (see FIG. 7, these data are also stored in the memory section 63), and by interpolation (Step S43).

Next, a special weighting factor setting routine is executed in which the special weighting factor generator 622 determines the special weighting factors $Sx_k$, $Sy_k$, $Sz_k$ for measuring the colorimetric property of the light to be measured by optimizing the general weighting factors $Gx_k$, $Gy_k$, $Gz_k$ stored in the weighting factor storage 631 based on the spectral intensity data $I_k$ calculated by the spectral intensity calculator 621 (Step S44).

Figure 13:
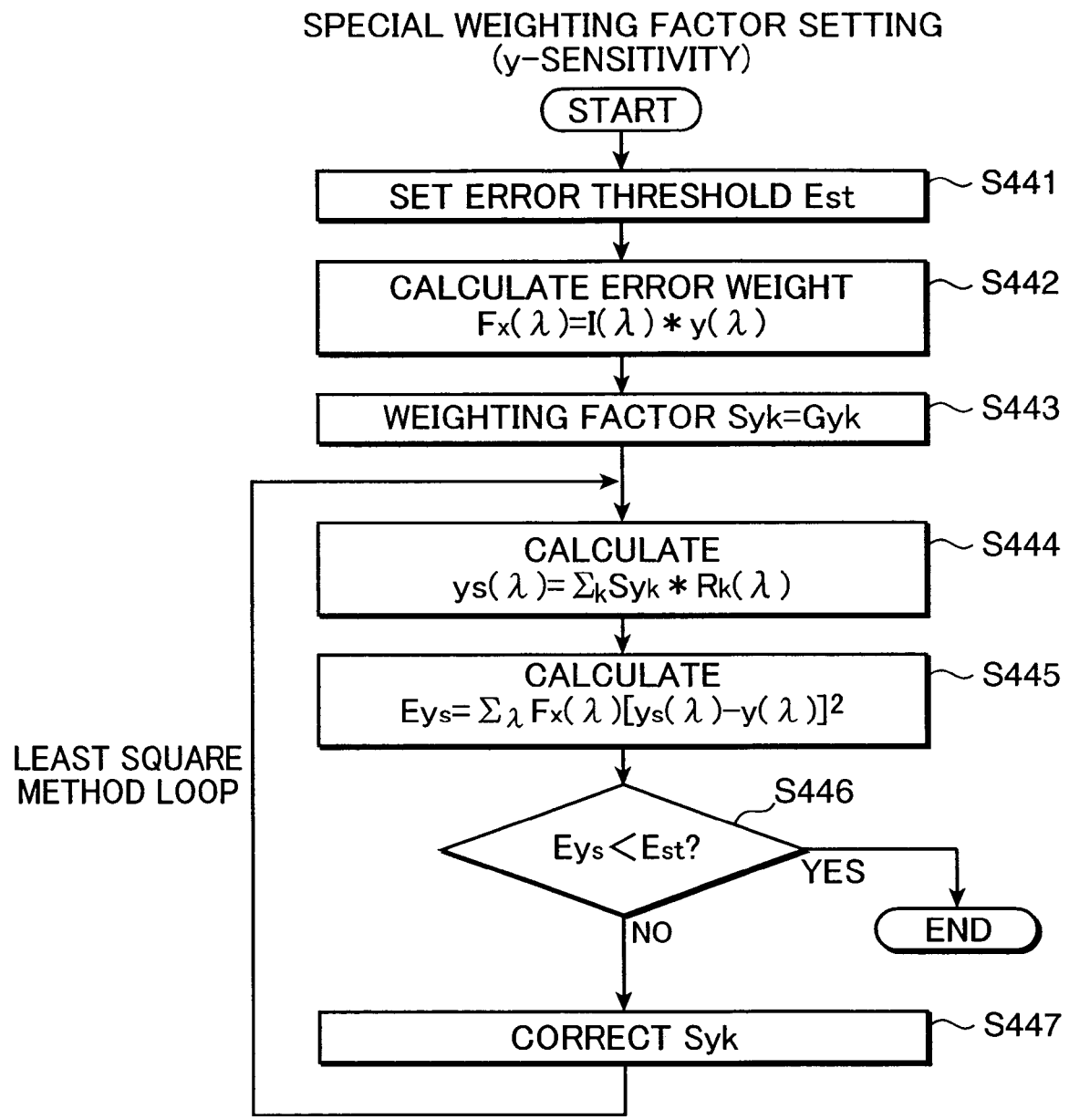
FIG. 13 is a flowchart showing a special weighting factor setting operation of the colorimeter.

FIG. 13 is a flowchart exemplarily showing the routine of determining (calculating) the special weighting factor $Sy_k$ with respect to the y-sensitivity. It should be noted that the special weighting factors $Sx_k$, $Sz_k$ are determined (calculated) individually in the similar manner as the special weighting factor $Sy_k$. In determining the special weighting factors $Sx_k$, $Sy_k$, $Sz_k$, first, a predetermined error threshold Est is set (Step S441). The error threshold Est is set for securing a necessary approximation precision, and is a targeted within which the residual approximation error should be.

Next, an error weight is calculated to each of the wavelengths depending on the spectral intensity of the light to be measured (Step S442). Specifically, while in the determination of the general weighting factors $Gx_k$, $Gy_k$, $Gz_k$, the approximation errors at respective wavelengths are integrated with uniform weights "1" for calculating the evaluation functions Exg, Eyg, Ezg, in the determination of the special weighting factors $Sx_k$, $Sy_k$, $Sz_k$, the approximation errors at respective wavelengths are integrated for calculating the evaluation functions but with error weights $Fx(\lambda)$, $Fy(\lambda)$, $Fz(\lambda)$ which vary depending on the wavelengths. This technique allows to set weighting factors with reduced approximation error in a narrow wavelength band in the case when the light with the specific narrow wavelength band is measured, and to set weighting factors with reduced approximation error in the vicinity of a peak wavelength in the case when monochromatic light of the specific peak wavelength is measured.

The error weight is a product of the spectral intensity $I(\lambda)$ calculated in Step S43, and the spectral sensitivities of the color-matching functions $x(\lambda)$, $y(\lambda)$, $z(\lambda)$ at the respective wavelengths. The error weights are calculated by the following equations (6-1), (6-2), (6-3).

$$Fx(\lambda)=I(\lambda) \cdot x(\lambda) \tag{6-1}$$

$$Fy(\lambda)=I(\lambda) \cdot y(\lambda) \tag{6-2}$$

$$Fz(\lambda)=I(\lambda) \cdot z(\lambda) \tag{6-3}$$

After setting $Sx_k=Gx_k$, $Sy_k=Gy_k$, $Sz_k=Gz_k$ as the initial values of the special weighting factor (Step S443), the flow enters an optimizing routine (least square method loop). Similar to the general weighting factors, the special weighting factors $Sx_k$, $Sy_k$, $Sz_k$ are so optimized by a least square method that special composite spectral sensitivities $xs(\lambda)$, $ys(\lambda)$, $zs(\lambda)$ calculated by the following equations (7-1), (7-2), (7-3) approximate the theoretical color-matching function (spectral sensitivity) $x(\lambda)$, $y(\lambda)$, $z(\lambda)$, as shown in FIG. 9, respectively. In the respective equations (7-1), (7-2), (7-3), the special weighting factors $Sx_k$, $Sy_k$, $Sz_k$ are correlated with the spectral sensitivities $R_k(\lambda)$ of the respective pixels obtained in Step S1.

The determination of the special weighting factors is different from the determination of the general weighting factor in the fact that in calculating the evaluation functions Exs, Eys, Ezs, squares of approximation errors at each of wavelengths are weighted with the respective error weights $Fx(\lambda)$, $Fy(\lambda)$, $Fz(\lambda)$ obtained by the equations (6-1), (6-2), (6-3) before summation.

$$xs(\lambda)=\Sigma_k Sx_k \cdot R_k(\lambda) \tag{7-1}$$

$$ys(\lambda)=\Sigma_k Sy_k \cdot R_k(\lambda) \tag{7-2}$$

$$zs(\lambda)=\Sigma_k Sz_k \cdot R_k(\lambda) \tag{7-3}$$

Accordingly, the special composite spectral sensitivities $xs(\lambda)$, $ys(\lambda)$, $zs(\lambda)$ are calculated by the equations (7-1), (7-2), (7-3) in which the general weighting factors are set as the special weighting factors at first (Step S444). Thereafter, sums Exs, Eys, Ezs of squares of differences between the special composite spectral sensitivities $xs(\lambda)$, $ys(\lambda)$, $zs(\lambda)$ calculated in Step S444, and the respective targeted color-matching functions (spectral sensitivities) $x(\lambda)$, $y(\lambda)$, $z(\lambda)$ at each of the wavelengths, are calculated by implementing the equations (8-1), (8-2), (8-3) in which the error weights $Fx(\lambda)$, $Fy(\lambda)$, $Fz(\lambda)$ are applied (Step S445).

$$Exs=\Sigma_\lambda Fx(\lambda) \cdot [xs(\lambda)-x(\lambda)]^2 \tag{8-1}$$

$$Eys=\Sigma_\lambda Fy(\lambda) \cdot [ys(\lambda)-y(\lambda)]^2 \tag{8-2}$$

$$Ezs=\Sigma_\lambda Fz(\lambda) \cdot [zs(\lambda)-z(\lambda)]^2 \tag{8-3}$$

Subsequently, the sums Exs, Eys, Ezs calculated in Step S445, and the error threshold Est set in Step S441 are compared (Step S446). If the sums Exs Eys, Ezs exceed the error threshold Est (NO in Step S446), the special weighting factors $Sx_k$, $Sy_k$, $Sz_k$ used in the above-stated caluculation are corrected, and the new special weighting factors $Sx_k$, $Sy_k$, $Sz_k$ are set (Step S447). Thereafter, the process returns to Step S444 to repeat the least square method loop.

Specifically, the special weighting factors $Sx_k$, $Sy_k$, $Sz_k$ are so optimized by the least square method that the sums Exs, Eys, Ezs calculated by the equations (8-1), (8-2), (8-3) as evaluation functions do not exceed the error threshold Est, namely, are minimized respectively. After determining the special weighting factors $Sx_k$, $Sy_k$, $Sz_k$ which satisfy the above-mentioned condition (YES in Step S446), tristimulus values are calculated by the composite intensity calculator 623 with use of the special weighting factors $Sx_k$, $Sy_k$, $Sz_k$ (Step S45 in FIG. 12). Alternatively, an error threshold Est may be set respectively, to the respective targeted color-matching functions $x(\lambda)$, $y(\lambda)$, $z(\lambda)$.

Specifically, the composite intensity calculator 623 calculates and outputs the data X', Y', Z' (composite intensities) which approximates theoretical tristimulus values X, Y, Z obtained according to the target color-matching functions $x(\lambda)$, $y(\lambda)$, $z(\lambda)$ defined by the CIE, by the equations (9-1), (9-2), (9-3), namely, by integrating the spectral intensity data $I_k$ obtained by the equation (5) (Step S42 in FIG. 12) multiplied by the special weighting factors $Sx_k$, $Sy_k$, $Sz_k$ obtained by implementing the flow of FIG. 13.

$$X'=\Sigma_k Sx_k \cdot I_k \tag{9-1}$$

$$Y'=\Sigma_k Sy_k \cdot I_k \tag{9-2}$$

$$Z'=\Sigma_k Sz_k \cdot I_k \tag{9-3}$$

The spectral characteristics, e.g., the colorimetric properties of the light to be measured are obtained based on the composite intensities X', Y', Z'.

According to the technique recited in the embodiment, the error weights $Fx(\lambda)$, $Fy(\lambda)$, $Fz(\lambda)$ represent the contribution of each spectral component $I(\lambda)$ of the light to be measured to the tristimulus values X, Y, Z. Accordingly, using the evaluation functions Exs, Eys, Ezs incorporating the error weights $Fx(\lambda)$, $Fy(\lambda)$, $Fz(\lambda)$ enables to set special weighting factors optimal to the incident light. As the special weighting factors $Sx_k$, $Sy_k$, $Sz_k$ are set by the special weighting factors generator 622 using the general weighting factors $Gx_k$, $Gy_k$, $Gz_k$ set during the production of the colorimeter 1 as initial values, approximation errors represented by the evaluation functions Exs, Eys, Ezs of the spectral sensitivities composed with use of the special weighting factors $Sx_k$, $Sy_k$, $Sz_k$ never exceed the approximation errors represented by the evaluation functions Exg, Eyg, Ezg of the spectral sensitivities composed with use of the general weighting factors $Gx_k$, $Gy_k$, $Gz_k$.

In the flowcharts shown in FIGS. 10 and 13, the least square method loops for determining the general weighting factors and the special weighting factors are configured in such a manner that the routine escapes from the loop, when the condition that the evaluation functions Exg, Eyg, Ezg (or the evaluation functions Exs, Eys, Ezs) are less than the predetermined error threshold Egt (or the error threshold value Est) (Step S35 or Step S446) is satisfied. Alternatively, a condition that the improvement ratio of the evaluation function is less than a predetermined improvement threshold may additionally be provided. In the aforementioned arrangement, the additional condition for escaping from the loop is that an improvement ratio dExg of the evaluation function Exg, for instance, from the (n-1)-th loop to the n-th loop is less than a predetermined improvement threshold:

$$dExg=[(Exg)_{n-1}-(Exg)_n]/(Exg)_n$$

where n represents the number of repeating the loop, and $(Exg)_n$ represents an evaluation function in the n-th loop. This modified arrangement enables to avoid unnecessary loop resulting no improvement in accuracy and to reduce the measuring time.

Figure 14:
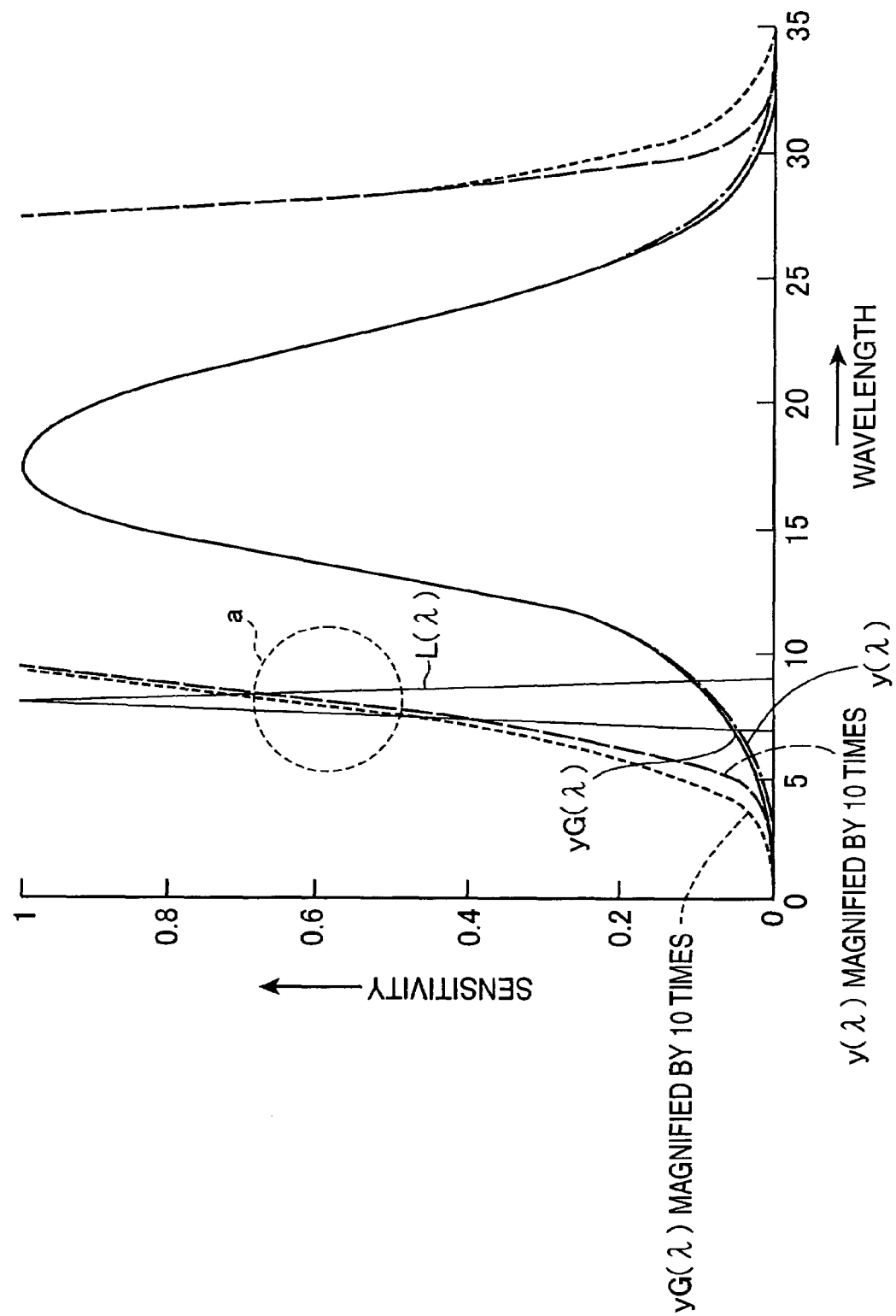
FIG. 14 is a graph showing a relation between a theoretical value of the y-sensitivity and a general composite sensitivity.
Figure 15:
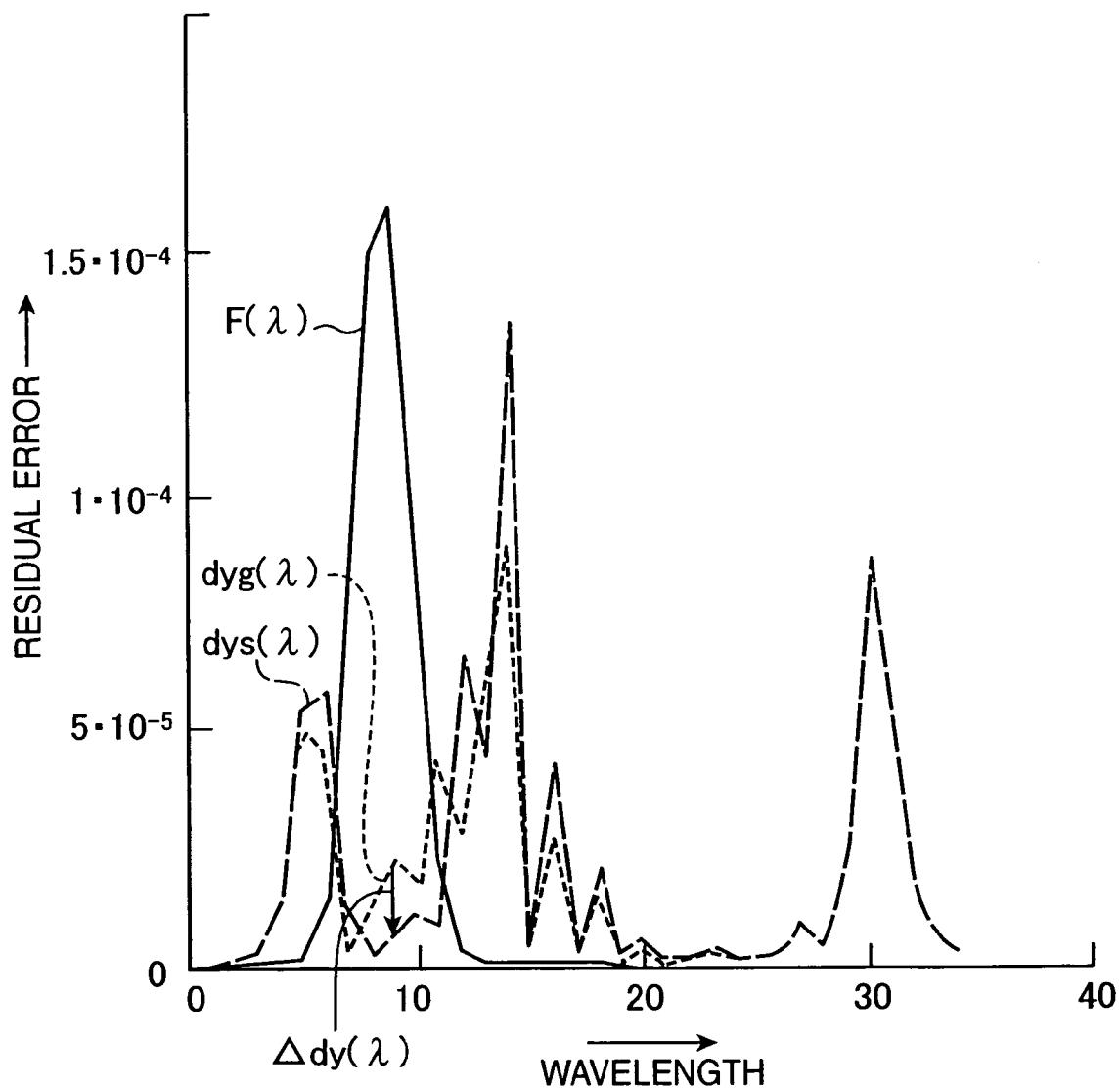
FIG. 15 is a graph showing residual error in the case where the stimulus value Y is measured.

FIGS. 14 and 15 shows the effects of the embodiment of the present invention in measuring the stimulus value Y of monochromatic light with the peak wavelength at 460 nm by the multi-channel colorimeter 1. Referring to FIG. 14, $L(\lambda)$ denotes a spectral intensity of monochromatic light of the wavelength 460 nm, $y(\lambda)$ denotes the theoretical y-sensitivity (spectral sensitivity defined by the CIE), and $yG(\lambda)$ denotes a general composite sensitivity obtained with use of the general weighting factor $Gy_k$ to be compared with the theoretical spectral sensitivity $y(\lambda)$. Apparently, the general composite sensitivity $yG(\lambda)$ substantially well approximates the spectral sensitivity $y(\lambda)$. However, observing general composite sensitivity $10 \cdot yG(\lambda)$ and spectral sensitivity $10 \cdot y(\lambda)$ which are 10 times magnifications of the general composite sensitivity $yG(\lambda)$ and the spectral sensitivity $y(\lambda)$, respectively, it is obvious that there exists a residual error in the vicinity of 460 nm, the wavelength region of the above-mentioned monochromatic light (in the dotted line circle in FIG. 14).

FIG. 15 shows a residual error in the aforementioned case. $F(\lambda)$ is an error weight obtained by implementing the calculation in Step S442. Since the error weight $F(\lambda)$ is dependent on the spectral intensity $I(\lambda)$, the error weight $F(\lambda)$ has a similar distribution as the distribution of the spectral intensity $L(\lambda)$ of the monochromatic light. Further, $dyg(\lambda)$ and $dys(\lambda)$ respectively represent a residual error of the general composite sensitivity $yG(\lambda)$, and a residual error of the special composite sensitivity $ys(\lambda)$ obtained with use of the special weighting factor $Sy_k$. As shown in FIG. 15, the residual error $dys(\lambda)$ of the special composite sensitivity $ys(\lambda)$ is improved by $\Delta\, dy(\lambda)$ as indicated by the arrow in FIG. 15, as compared with the residual error $dyg(\lambda)$ of the general composite sensitivity in a wavelength region of a large error weight $F(\lambda)$, namely, in the wavelength region of the monochromatic light. Specifically, when comparing errors due to approximation, the error of the composite stimulus value Y' based on the special composite sensitivity $ys(\lambda)$ of the monochromatic light is about 2.3%, whereas the error of the composite stimulus value Y' based on the general composite sensitivity $yg(\lambda)$ is about 6.7%. The result reveals that the residual error from the special composite sensitivity $ys(\lambda)$ is suppressed as low as about ⅓ of the residual error from the general composite sensitivity $yg(\lambda)$.

The residual error may be increased in wavelength regions other than the wavelength region of the monochromatic light. However, since there is no light to be measured in such wavelength regions, the increased residual error does not affect the measurement accuracy. In other words, in the case when measuring the monochromatic light, the special weighting factor generator 622 gives higher priority to reducing the residual error in the vicinity of the peak wavelength of monochromatic light in setting the special weighting factors $Sx_k$, $Sy_k$, $Sz_k$, rather than securing overall approximation precision in whole wavelength range as obtained by the general composite sensitivity $yg(\lambda)$. Further, the special weighting factor generator 622 sets the special weighting factors $Sx_k$, $Sy_k$, $Sz_k$ for improving the residual error in specific wavelength band(s), in the case when measuring the light distributed in the specific wavelength band(s), including light having a peak with the relatively broad half bandwidth, or having multiple peaks.

Use of the special composite sensitivity $ys(\lambda)$ is advantageous in raising the approximation precision in the wavelength region of the monochromatic light, although the overall approximation precision may be lowered. Furthermore, the multi-channel colorimeter 1 according to the present embodiment enables to accept the wider wavelength interval of the wavelength channels than the conventional multi-channel colorimeter which composes the color-matching function with the wavelength channels with the wavelength interval of 10 nm for instance. Because in the arrangement of the embodiment, even if the wavelength channels are arrayed with the wavelength interval of 20 nm for instance, sufficient precision in the measurement of the colorimetric property (spectral characteristics) of the light to be measured can be secured due to the use of the special weighting factors $Sx_k$, $Sy_k$, $Sz_k$ set depending on the spectral intensity $I(\lambda)$ of the light. Thus, this arrangement contributes to the production cost reduction and downsizing of the colorimeter by reducing the number of the wavelength channels by half.

The following is a brief description on the embodiments of the present invention.

(1) A multi-channel colorimeter comprises: a spectral means that separates light to be measured into components of different wavelengths; a photoelectric converter provided with multiple wavelength channels that receive the separated light to be measured according to the wavelengths to output corresponding signals at the respective wavelengths; a calculating section that calculates spectral characteristics of the light to be measured based on a composite spectral sensitivity which approximates a predetermined spectral sensitivity by integrating the outputs from the respective wavelength channels multiplied by predetermined weighting factors; and a special weighting factor generator that correctively sets the weighting factors as special weighting factors depending on a spectral intensity of the light to be measured.

In the above arrangement, the special weighting factor generator correctively sets the weighing factors for composing a spectral sensitivity optimized for measuring the spectral characteristics (colorimetric property) of the light to be measured, based on the measured spectral intensity and the calculating section calculates the spectral characteristics of the light to be measured based on the spectral sensitivity composed by the newly set weighing factors, instead of fixedly using a composite spectral sensitivity set in the production process as the case of conventional colorimeters. In determining aforementioned weighting factors, the evaluation functions are calculated as sums of approximation errors at each of wavelengths weighted differently depending on the wavelength instead of uniform weighting with respect to the wavelength.

Thus, the aforementioned optimal weighting factors depending on the spectral intensity of the light to be measured are set each time of measurement, and the spectral characteristics (colorimetric property) of the light based on the composite spectral sensitivity approximating the predetermined spectral sensitivity is obtained by integrating the outputs from the respective wavelength channels multiplied by aforementioned weighting factors with respect to the respective wavelength channels. This arrangement enables to measure the colorimetric property of a variety of light such as white light and monochromatic light of various wavelengths with high precision, as compared with the conventional multi-channel colorimeter.

(2) A multi-channel colorimeter preferably is the multi-channel colorimeter (1), wherein the special weighting factor generator, in a case when measuring light in specific wavelength band(s), sets the special weighting factor for improving approximation error in the specific wavelength band(s).

In the above arrangement, when measuring the light within the specific wavelength band(s), the calculating section calculates the spectral characteristics of the light based on the composite spectral sensitivity whose approximation error is minimized in the specific wavelength band(s), instead of a fixed composite spectral sensitivity whose approximation error is not minimized in the specific wavelength band(s), despite an apparent fact that the overall measurement error is well suppressed, as the case of conventional multi-channel colorimeters. Thus, this arrangement enables to measure the colorimetric property of the light within the specific wavelength band(s) with high precision, as compared with conventional multi-channel colorimeters.

(3) A multi-channel colorimeter preferably is the multi-channel colorimeter (2), wherein the special weighting factor generator, in a case of when measuring monochromatic light of a specific wavelength, sets the special weighting factor for improving approximation error in a vicinity of a peak wavelength of the monochromatic light.

In the above arrangement, the calculating section calculates the spectral characteristics of the monochromatic light to be measured based on the composite spectral sensitivity whose approximation error is minimized in the vicinity of a peak wavelength of the monochromatic light instead of a fixed composite spectral sensitivity, whose approximation error is not minimized with respect to the monochromatic light, despite an apparent fact that the overall measurement error is well suppressed, as the case of conventional multi-channel colorimeters. Thus, this arrangement enables to measure the colorimetric property of the monochromatic light with high precision, as compared with conventional multi-channel colorimeters.

(4) A multi-channel colorimeter preferably is the multi-channel colorimeter (1), wherein the special weighting factor generator determines the special weighting factors in such a manner as to minimize an integrated error obtained by multiplying a difference between the predetermined spectral sensitivity and the composite spectral sensitivity at each of the wavelengths or a function of-the difference, by a weight that depends on the spectral intensity of the light to be measured with respect to each of the wavelengths, and by integrating each product of the difference or the function thereof and the weight.

In the above arrangement, the weighting factors are determined in such a manner as to minimize the integrated error obtained by multiplying the difference between the predetermined spectral sensitivity and the composite spectral sensitivity with respect to each of the wavelengths, or a function thereof by the weight which depends on the spectral intensity of the light to be measured with respect to each of the wavelengths and by integrating the products. This arrangement enables to set the weighting factors optimized to a variety of incident light such as white light and monochromatic light of various wavelengths.

(5) A multi-channel colorimeter preferably is the multi-channel colorimeter (4), wherein the aforementioned weight which depends on the spectral intensity of the light to be measured with respect to each of the wavelengths is a product of the spectral intensity of the light to be measured and the predetermined spectral sensitivity with respect to each of the wavelengths.

In the above arrangement, the product of the spectral intensity of the light to be measured and the predetermined spectral sensitivity with respect to each of the wavelengths is used as the weight which depends both on the spectral intensity of the light to be measured and the predetermined spectral sensitivity to be applied, namely the contribution to the spectral characteristics, with respect to each of the wavelengths.

(6) A method for measuring spectral characteristics of light to be measured comprises the steps of: separating the light to be measured into components of different wavelengths to receive the light to be measured through multiple wavelength channels; and calculating a spectral characteristics of the light to be measured based on a composite spectral sensitivity which approximates a predetermined spectral sensitivity by integrating outputs from the respective wavelength channels multiplied by predetermined weighting factors, wherein the weighting factors are set depending on the spectral intensity of the light to be measured.

In the above arrangement, the weighing factors for composing a spectral sensitivity optimized for measuring the colorimetric property of the light to be measured, based on the measured spectral intensity, and the colorimetric property of the light to be measured are obtained based on the new composite spectral sensitivity, instead of fixedly using a composite spectral sensitivity set in the production process as the case of conventional colorimeters.

Thus, the optimized weighting factors depending on the spectral intensity of the light to be measured are set each time of measurement, and the spectral characteristics (colorimetric property) of the light to be measured based on the composite spectral sensitivity approximating the predetermined spectral sensitivity by integrating the outputs from the respective wavelength channels multiplied by aforementioned weighting factors with respect to the respective wavelength channels. This arrangement enables to measure the colorimetric property of a variety of the light such as white light and monochromatic light of various wavelengths with high precision and with less measurement error.

(7) A method for measuring spectral intensity characteristics of light to be measured preferably is a method (6), wherein a wavelength band of the light to be measured is detected based on the spectral intensity of the light to be measured, and the weighting factors are correctively set as special weighting factors for improving an approximation error at least in the detected wavelength band.

In the above arrangement, the spectral characteristics of monochromatic light to be measured are calculated based on the composite spectral sensitivity whose residual error is minimized at least in the wavelength band of the monochromatic light instead of a fixed composite spectral sensitivity, whose approximation error is not minimized in the wavelength band of the monochromatic light, despite an apparent fact that the overall measurement error is well suppressed, as the case of conventional multi-channel colorimeters.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A multi-channel colorimeter comprising:
 a spectral means that separates light to be measured into components of different wavelengths;
 a photoelectric converter provided with multiple wavelength channels that receive the separated light to be measured according to the wavelengths, the photoelectric converter configured to output signals on the respective channels corresponding to the respective wavelengths;
 a calculating section that converts the output signals to a spectral intensity of the light to be measured and calculates colorimetric properties of the light to be measured based on a composite spectral sensitivity which approximates a predetermined spectral sensitivity by integrating the outputs from the respective wavelength channels multiplied by corresponding weighting factors; and a special weighting factor generator configured to correctively generate the corresponding weighting factors as a special weighting factor correlated with each of spectral sensitivities of said multiple wavelength channels for the light to be measured each time a measurement is performed, based on said spectral intensity of the light to be measured, for improving an accuracy of the calculated colorimetric properties of the light to be measured.

2. The multi-channel colorimeter according to claim 1, wherein the special weighting factor generator, when measuring light in specific wavelength band(s), generates the special weighting factor for improving an approximation error in the specific wavelength band(s).

3. The multi-channel colorimeter according to claim 2, wherein the special weighting factor generator, when measuring monochromatic light of a specific wavelength, generates the special weighting factor for improving an approximation error in a vicinity of a peak wavelength of the monochromatic light.

4. The multi-channel colorimeter according to claim 1, wherein the special weighting factor generator generates the special weighting factors to minimize an integrated error obtained by multiplying a difference between the predetermined spectral sensitivity and the composite spectral sensitivity at each of the wavelengths or a function of the difference, by an error weight that depends on the spectral intensity of the light to be measured with respect to each of the wavelengths, and by integrating each product of the difference or the function and the error weight thereof 5. The multi-channel colorimeter according to claim 4, wherein said error weight is a product of the spectral intensity of the light to be measured and the predetermined spectral sensitivity with respect to each of the wavelengths.

6. A method for measuring colorimetric properties of light to be measured comprising the steps of:
separating the light to be measured into components of different wavelengths;
receiving the light to be measured through a photoelectric converter having multiple wavelength channels;
converting said output signals to a spectral intensity of the light to be measured;
correctively generating corresponding weighting factors as special weighting factors for the light to be measured each time a measurement is performed based on said spectral intensity of the light to be measured; and
calculating a colorimetric property of the light to be measured based on a composite spectral sensitivity which approximates a predetermined spectral sensitivity, the calculation of the colorimetric property performed by integrating outputs from the respective wavelength channels multiplied by said special weighting factors generated for the light to be measured, wherein
each corresponding weighting factor is calculated based on a spectral intensity of the light for each measurement to be taken.

7. The method according to claim 6, wherein a wavelength band of the light to be measured is detected based on the spectral intensity of the light to be measured, and the weighting factors are correctively generated as special weighting factors for improving an approximation error at least in the detected wavelength band.

8. The method according to claim 7, wherein a special weighting factor generator, when measuring light in specific wavelength band(s), generates the special weighting factor for improving an approximation error in the specific wavelength band(s).

9. The method according to claim 8, wherein the special weighting factor generator, when measuring monochromatic light of a specific wavelength, generates the special weighting factor for improving an approximation error in a vicinity of a peak wavelength of the monochromatic light.

10. The method according to claim 6, wherein special weighting factors are calculated to minimize an integrated error obtained by multiplying a difference between the predetermined spectral sensitivity and the composite spectral sensitivity at each of the wavelengths or a function of the difference, by an error weight that depends on the spectral intensity of the light to be measured with respect to each of the wavelengths, and by integrating each product of the difference or the function and the error weight.

11. The method according to claim 10, wherein the error weight is a product of the spectral intensity of the light to be measured and the predetermined spectral sensitivity with respect to each of the wavelengths.

* * * * *